(12) United States Patent
Kline

(10) Patent No.: US 7,191,954 B2
(45) Date of Patent: Mar. 20, 2007

(54) METHOD OF MIXING FLUIDS USING A VALVE

(75) Inventor: Kevin B. Kline, Whitefish Bay, WI (US)

(73) Assignee: Magarl, LLC, Indianapolis, IN (US)

( * ) Notice: Subject to any disclaimer, the term of this patent is extended or adjusted under 35 U.S.C. 154(b) by 0 days.

(21) Appl. No.: 10/939,585

(22) Filed: Sep. 13, 2004

(65) Prior Publication Data

US 2005/0028876 A1 Feb. 10, 2005

Related U.S. Application Data

(60) Continuation of application No. 10/378,185, filed on Mar. 3, 2003, now Pat. No. 6,851,440, which is a continuation of application No. 09/941,141, filed on Aug. 28, 2001, now Pat. No. 6,543,478, which is a division of application No. 09/633,728, filed on Aug. 7, 2000, now Pat. No. 6,315,210, which is a continuation of application No. 09/165,880, filed on Oct. 2, 1998, now abandoned.

(51) Int. Cl.
*G05D 23/13* (2006.01)

(52) U.S. Cl. .......................................... 236/12.2; 4/676

(58) Field of Classification Search ............ 4/676–677; 137/625.4, 625.41; 236/12.1–12.2
See application file for complete search history.

(56) References Cited

U.S. PATENT DOCUMENTS

| | | | |
|---|---|---|---|
| 289,954 | A | 12/1883 | Badger |
| 1,195,722 | A | 8/1916 | Powers et al. |
| 1,243,999 | A | 1/1917 | Snediker |
| 1,417,291 | A | 5/1922 | Allen |
| 1,535,051 | A | 4/1925 | Smith et al. |

(Continued)

FOREIGN PATENT DOCUMENTS

| | | |
|---|---|---|
| DE | 36 14 735 | 11/1987 |
| DE | 42 37 435 | 5/1994 |
| FR | 2 550 306 | 2/1985 |

OTHER PUBLICATIONS

Lawler Automatic Controls, Inc., "Where, Why, How to Specify The Recesso—Recessed Thermostatic Shower-Bath Mixing Valve," bates Nos. 000060856-000060859, bearing a designation "Copyright, 1962".

(Continued)

*Primary Examiner*—Wílliam E. Tapolcai
(74) *Attorney, Agent, or Firm*—John V. Daniluck; Bingham McHale LLP

(57) ABSTRACT

A thermostatic mixing valve for the mixing of a first fluid and a second fluid is disclosed. The thermostatic mixing valve is configured to produce a mixed fluid of a particular temperature from a first fluid of a temperature higher than or equal to the particular temperature and a second fluid of a temperature lower than or equal to the particular temperature. The thermostatic mixing valve includes a valve body having a first fluid inlet, a second fluid inlet, and a mixed fluid outlet. The thermostatic mixing valve also includes a valve member configured to control the rate of flow of at least the first fluid. The valve member includes a thermostatic control device in communication with the mixed fluid and a shuttle coupled to the thermostatic control device, configured for movement within a liner, and oriented to adjustably engage the flow of at least the first fluid through at least one opening within a wall of the liner, the direction of flow of the first fluid being at least partially transverse with respect to the shuttle. At least one fluid inlet may include a check valve configured to prevent fluid from flowing out of the valve through the inlet. The check valve includes a first check valve member which is stationary, a second check valve member which is movable and engageable with the first check valve member, and a spring for urging the second check valve member into engagement with the first check valve member and for defining the path of motion of the second check valve member.

20 Claims, 16 Drawing Sheets

U.S. PATENT DOCUMENTS

| | | | |
|---|---|---|---|
| 1,879,344 A | 9/1932 | Lawler | |
| 1,915,867 A | 6/1933 | Penick | |
| 1,931,896 A | 10/1933 | Henning | |
| 1,990,653 A | 2/1935 | Kollsman | |
| RE19,488 E | 3/1935 | Russell et al. | |
| 2,125,245 A | 7/1938 | McCray | |
| 2,172,489 A | 9/1939 | Young | |
| 2,203,130 A | 6/1940 | Costello | |
| 2,211,672 A | 8/1940 | Reeder | |
| 2,250,815 A | 7/1941 | Ruegg et al. | |
| 2,282,152 A | 5/1942 | Babbin | |
| 2,317,717 A | 4/1943 | Bauman | |
| 2,387,792 A | 10/1945 | Holmes | |
| 2,503,901 A | 4/1950 | Chace | |
| 2,535,893 A | 12/1950 | Branson | |
| 2,569,838 A | 10/1951 | Vinson | |
| 2,636,776 A | 4/1953 | Vernet | |
| 2,713,972 A | 7/1955 | Geise | |
| 2,791,379 A | 5/1957 | Dew | |
| 2,792,847 A | 5/1957 | Spencer | |
| 2,803,408 A | 8/1957 | Hope | |
| 2,828,075 A | 3/1958 | Panza et al. | |
| 2,855,151 A | 10/1958 | Lesovsky | |
| 3,001,717 A | 9/1961 | Rimsha et al. | |
| 3,004,710 A | 10/1961 | Couffer, Jr. et al. | |
| 3,036,777 A | 5/1962 | Budde | |
| 3,044,707 A | 7/1962 | Bayer | |
| 3,061,195 A | 10/1962 | Bowman | |
| 3,361,412 A | 1/1968 | Cole, III | |
| 3,561,482 A | 2/1971 | Taplin | |
| 3,593,964 A | 7/1971 | Morane | |
| 3,739,945 A | 6/1973 | Moore et al. | |
| 3,768,728 A | 10/1973 | Blank | |
| 3,782,412 A | 1/1974 | Daresh | |
| 3,827,016 A | 7/1974 | Knapp | |
| 3,925,283 A | 12/1975 | Dahl | |
| 3,929,281 A | 12/1975 | Woodward | |
| 3,929,383 A | 12/1975 | Delpia | |
| 3,938,741 A | 2/1976 | Allison | |
| 3,955,759 A | 5/1976 | Knapp | |
| 3,958,555 A * | 5/1976 | Horne | 122/13.3 |
| 4,082,219 A | 4/1978 | Rogers, Jr. et al. | |
| 4,165,034 A | 8/1979 | Rogers, Jr. et al. | |
| 4,195,656 A | 4/1980 | Kanerva et al. | |
| 4,284,102 A | 8/1981 | Adler | |
| 4,285,465 A | 8/1981 | North | |
| 4,299,354 A | 11/1981 | Ketley | |
| 4,304,358 A | 12/1981 | Riis | |
| 4,475,684 A | 10/1984 | Garlick et al. | |
| 4,480,784 A | 11/1984 | Bennett | |
| 4,514,095 A | 4/1985 | Ehrfeld et al. | |
| 4,819,867 A | 4/1989 | Delpla et al. | |
| 4,883,225 A | 11/1989 | Kitchens | |
| 4,913,182 A | 4/1990 | Whiteside | |
| 4,923,115 A | 5/1990 | Sekoguchi et al. | |
| 5,011,074 A | 4/1991 | Kline | |
| 5,050,062 A | 9/1991 | Hass | |
| 5,161,737 A | 11/1992 | Olmsted et al. | |
| 5,203,496 A | 4/1993 | Kline | |
| 5,206,963 A * | 5/1993 | Wiens | 4/603 |
| 5,323,960 A | 6/1994 | Kline | |
| 5,341,987 A | 8/1994 | Ackroyd | |
| 5,379,936 A | 1/1995 | Kline | |
| 5,524,820 A * | 6/1996 | Regan | 237/19 |
| 5,647,530 A | 7/1997 | Lorch | |
| 5,913,614 A * | 6/1999 | Smith et al. | 4/668 |

OTHER PUBLICATIONS

Leonard Valve Company, "Leonard LVC Thermostatic Showermaster Installation Instructions," bates Nos. 000052315-000052316, bearing a designation "1963 to 1966".

Powers Regulator Company, "Powers No. 11 Automatic Regulator," bates Nos. 000050795-000050797, bearing a designation "Jun., 1970".

Powers Regulator Company, "Powers Accritem/Flowrite.RTM. Temperature Controls," bates Nos. 000050807-000050809, bearing a designation "Mar., 1974".

Powers Regulator Company, "Powers Hydroguard.TM. Series 410 Pressure-Equalizing Shower/Bath Controls," bates Nos. 000050682-000050684, bearing a designation "Jun. 1975".

Powers Regulator Company, "Powers Hydroguard.TM. Series 420 Thermostatic Shower/Bath Controls," bates Nos. 000050708-000050710, bearing a designation "Sep. 1975".

Powers-Flat, "Type ST Flowrite. RTM.," bates No. 0000500806, bearing a designation "STFV-1-79".

Lynnwood Industries, Inc., "rada 17" promotional materials, bearing a designation ".COPYRGT. Walker Crosweller & Co. Ltd. Aug. 1985" (best copy available).

Leonard Valve Company, "PAM II Pressure Actuated Water Mixing Valve," bates Nos. 000050106-000050109, bearing a designation "Nov. 1985".

Leonard Valve Company, "LV-477B Installation and Maintenance," bates Nos. 000052346-000052347, bearing a designation "Apr. 1986".

Leonard Water Temperature Controls, "Instructions for Cleaning and Servicing M-15-C, M-20-C, M-15-E, M-20-E," bates Nos. 000052351-000052352, bearing a designation "Jun. 1986".

Leonard Valve Company, "LV-477E Repair and Maintenance," bates No. 000052345, bearing a designation "Jun. 1986".

Leonard Valve Company, "Type TM Thermostatic Water Mixing Valves," bates Nos. 000050133-000050138, bearing a designation "TM-1B 1188" on bates No. 000050133 and "Jul. 1986" on bates No. 000050137.

Gregory L. Wilcox, "Sizing and Application of large thermostatic water mixing valves," reprinted from Heating/Piping/Air Conditioning, Sep. 1986.

Leonard Valve Company, "LVC Thermostatic Showermaster Installation Instructions," bates Nos. 000052313-000052314, bearing a designation "Aug. 1988".

Leonard Valve Company, "Model 110 Thermostatic Tempering Valve," bates Nos. 000052341-000052342, bearing a designation "Aug. 1988".

Leonard Valve Company, "Installation Adjustment Service TM-200, TM-225B, TM-300 (also T-225, T-250, T-300) Thermostatic Water Mixing Valves," bates Nos. 000052333-000052336, bearing a designation "Dec. 1988".

Leonard Water Temperature Controls, "Installation Adjustment Service Type TM-50, 80, 125, 150," bates Nos. 000052194-000052199, bearing a designation "Jun. 1989".

Leonard Valve Company, "Installation Adjustment Service Type TM-50, 80, 125, 150," bates Nos. 000052327-000052332, bearing a designation "Jun. 1989".

Leonard Valve Company, "LVC Thermostatic Showermaster Installation Instructions," bates Nos. 000052311-000052312, bearing a designation "May 1990".

Powers Process Controls, "What's behind the newest race in water tempering control?: Hydroguard.TM. Series 410 Pressure Balancing Valves, Hydroguard.TM. Series 420 Thermostatic Mixing Valves," bates Nos. 0000-51465-000051471, bearing a designation ".COPYRGT. 1991 Powers Process Controls".

Leonard Valve Company, "Thermostatic Mixing Valves—M-10, 15, 20 Showermaster," bates Nos. 000050923-000050926, bearing a designation "LV 105 Jun. 1992".

Leonard Valve Company, "Thermostatic Mixing Valves LVC Showermaster," bates Nos. 0000-50932-000050935, bearing a designation "LV 107 Jun. 1992".

Leonard Valve Company, "PAM II Pressure Actuated Shower Valves," bates Nos. 000050950-000050953, bearing a designation "LV 106 Jun. 1992".

Leonard Valve Company, "Pressure Actuated Shower Valves—Advantage 6700 Series," bates Nos. 000050941-000050942 and 000050946, bearing a designation "LV 114 Feb. 1992".

Powers Process Controls, "Technical Instructions—hydroguard. TM. Series 410 Valves," bates Nos. 000051473-000051476, bearing a designation "Feb. 1994".

Leonard Valve Company, "High-Low Manifold Systems," bates Nos. 0000-50994-000050996, bearing a designation "LV 110 Jun. 1994".

Lawler Manufacturing Co., Inc., "Stop and Check Valves (Plumbing)," bates No. 35176, bearing a designation "Sep. 1995".

Lawler Manufacturing Co.,, "Stop and Check Valves," bates No. 35177, bearing a designation "Sep. 1995".

Lawler Manufacturing Co., Inc., "Series 9600 Thermostatic Mixing Valve for Photo Service," bates No. 35173, bearing a designation "Sep. 1995".

Lawler Manufacturing Co., Inc., "Series PX-9700 Thermostatic and Pressure Balanced Mixing Valve for Photo service" bates No. 35174, bearing a designation "Sep. 1995".

Lawler Manufacturing Co., Inc., "Stop and Check Valves Photographic," bates No. 35175, bearing a designation "Sep. 1995".

Symmons Industries, Inc., "What is Pressure Balancing," bates No. 000051701, bearing a designation of "Printed in U.S.A. Form No. VT-IR Mar. 1990".

Lawler Manufacturing Co., Inc., "Series 802 Thermostatic Mixing Valve," bates No. 35170, bearing a designation "Sep. 1995".

Lawler Manufacturing Co., Inc., "Series 805 Thermostatic Mixing Valve," bates No. 35171, bearing a designation "Sep. 1995".

Lawler Manufacturing Co., Inc., "Series 9200 Thermostatic Mixing Valve for Photo Service," bates No. 35172, bearing a designation "Sep. 1995".

Lawler Manufacturing Co., Inc., "Model 3500 Shower Mixing Valve," bates No. 35164, bearing a designation "Sep. 1995".

Lawler Manufacturing Co., Inc., "Model 3800 Shower Mixing Valve," bates No. 35165, bearing a designation "Sep. 1995".

Lawler Manufacturing Co., Inc., "Series 4000 Thermostatic Mixing Valve," bates No. 35166, bearing a designation "Sep. 1995".

Lawler Manufacturing Co., Inc., "7000 7500 7700 Shower Mixing Valve," bates No. 35161, bearing a designation "Sep. 1995".

Lawler Manufacturing Co., Inc., "7000 7500 7700 7800 Echelon Shower Mixing Valve," bates No. 35162, bearing a designation "Sep. 1995".

Lawler Manufacturing Co., Inc., "Model 3600 'Recesso' Shower Mixing Valve," bates No. 35163, bearing a designation "Sep. 1995".

Lawler Manufacturing Co., Inc., "Series 61 Thermostatic Mixing Valve," bates No. 35167, bearing a designation "Sep. 1995".

Lawler Manufacturing Co., Inc., "Series 66 Thermostatic Mixing Valve," bates No. 35168, bearing a designation "Sep. 1995".

Lawler Manufacturing Co., Inc., "Series 67 Thermostatic Mixing Valve," bates No. 35169, bearing a designation "Sep. 1995".

Watts Industries, Inc., "Series N170-M2" promotional materials, bearing a designation ".COPYRGT. Watts Regulator Co., 1996".

Lawler Manufacturing Company, Inc., "Amtrak Thermostatic Shower Fixtures" Parts List, bearing a designation "Oct. 1995" (best copy available).

Leonard Valve Company, "Model 210 (new Style) Thermostatic Water Mixing Valves Installation Setup and Operating Instructions," bates Nos. 000050963-000050968, bearing a designation "Feb. 1997".

Armstrong-Lynnwood, Inc. "rada 320" promotional materials, bearing a designation "Jun. 1998" (best copy available).

Bradley Corporation, "Emergency Fixtures" promotional materials, p. 25, updated.

Bradley Corporation, "Bradley Plumbing Fixtures," excerpted pages between bates No. 000051147 and 000051414, undated.

Bradley Corporation, "Vernatherm.TM. Thermostatic Mixing Valve Assembly," bates Nos. 000052626-000052627, undated.

Eastman Kodak Co., "Series "PX-9700" Thermostatic Mixing Valve for Photographic and X-Ray Developing" Installation and Maintenance Manual, bates Nos. 35220-35223, undated.

O.C. Keckley Company, "Keckley Steam and Liquid Control Valves and Strainers," bates Nos. 000052388-000052411, undated.

Lawler Manufacturing Company, Inc., "Type "SFS" Thermostatic Temperature Regulator" Installation and Maintenance Manual, bates Nos. 35007-35013, undated.

Lawler Manufacturing Company, Inc., "Series 70 Water Pressure Equalizer" Installation and Maintenance Manual, bates Nos. 35014-35015, undated.

Lawler Manufacturing Company, Inc., "Type "S" Thermostatic Temperature Regulators" Installation, Operation and Service Instructions, bates Nos. 35018-35024, undated.

Lawler Manufacturing Company, Inc., "Series 66/Series 800 Thermostat Repair Kit" Installation and Maintenance Manual, bates Nos. 35039-35040, undated.

Lawler Manufacturing Company, Inc., "Model 805" Installation and Maintenance Manual, bates Nos. 35042-35046, undated.

Lawler Manufacturing Company, Inc., "Series 7000 Double Stage Thermostatic Shower Valve" Installation and Maintenance Manual, bates Nos. 35051-35054, undated.

Lawler Manufacturing Company, Inc., "Series 9700" Installation and Maintenance Manual, bates Nos. 35059-35062, undated.

Lawler Manufacturing Company, Inc., "Series 67" Installation and Maintenance Manual, bates Nos. 35067-35070, undated.

Lawler Manufacturing Company, Inc., "Series 61" Installation and Maintenance Manual, bates Nos. 35075-35078, undated.

Lawler Manufacturing Company, Inc., "Series 911 Emergency Shower Valve" Installation and Maintenance Manual, bates Nos. 35083-35086, undated.

Lawler Manufacturing Company, Inc., "Series 911E Emergency Eye Wash Valve" Installation and Maintenance Manual, bates Nos. 35091-35094, undated.

Lawler Manufacturing Company, Inc., "Series 9600" Installation and Maintenance Manual, bates Nos. 35099-35102, undated.

Lawler Manufacturing Company, Inc., "Series 9200" Installation and Maintenance Manual, bates Nos. 35107-35110, undated.

Lawler Manufacturing Company, Inc., "Series 4000" Installation and Maintenance Manual, bates Nos. 35115-35118, undated.

Lawler Manufacturing Company, Inc., "Series 3000 Thermostatic Single Stage Shower Valve" Installation and Maintenance Manual, bates Nos. 35123-35126, undated.

Lawler Manufacturing Company, Inc., "Series 66" Installation and Maintenance Manual, bates Nos. 35248-35251, undated.

Lawler Automatic Controls, Inc., "Installation and Maintenance-Setting BAM Plungers in the Field," bates No. 000060878, undated.

Lawler Manufacturing Company, Inc., "Model 802" Installation and Maintenance Manual, bates Nos. 35260-35263, undated.

Lawler Automatic Controls, Inc., "Pocket Service Manual," bates Nos. 000060870-000060877, undated.

Lawler Automatic Controls, Inc., "Installation and Maintenance—BAM Thermostat Group Technical Data," bates No. 000060865, undated.

Lawler Automatic Controls, Inc., "Type BAM Thermostatic Water Controller With Three Way Fail Safe Feature," bates Nos. 000060866-000060869, undated.

Lawler Manufacturing Company, Inc., "Series 1140" Installation and Maintenance Manual, bates Nos. 35268-35279, undated.

Leonard Water Temp. Controls, "Instructions for Adjustment and Service—Type T Thermostatic Water Mixing Valves T-25, T-40, T-50, T-60, T-75, T-100, T-125, T-150," bates Nos. 000052337-000042340, undated.

Leonard Valve Company, "Instructions For Installation Adjustment Service THS-25-VBD Thermostatic Steam and Water Mixers," bates Nos. 000052343-000052344, undated.

Meynell Valves Inc., "Installation & Maintenance Sheet," bates Nos. 000060860-000060864, undated.

Powers Process Controls, Hydroguard.TM. Series 420 Thermostatic Mixing Valves—The Ultimated in Bather Protection, bates Nos. 000051486-000051491, undated.

Powers Process Controls, "Powers Hydroguard.TM. Series 430 Master Mixing Valves," bates Nos. 000050449-000050453, undated.

Powers Process Controls, "Biltmore 900," bates Nos. 000050395-000050399, undated.

Powers Process Controls, "Bronze and Cast Iron Body Globe Valves," bates Nos. 000050545-000050616, undated.

Powers Process Controls, "Condensed Catalog," excerpted pages between bates Nos. 000050196-000050289, undated.

Symmons Engineering Company, "Mon-O-Mixer Instruction & Repair Sheet," bates Nos. 000051639-000051641, undated.

Symmons Engineering Company, "Temptrol '76 Pressure-Actuated Non-Scald Shower Valve-Installation Instructions Service Information Repair Parts Data," bates Nos. 000051687-000051692, undated.

Symmons Engineering Company, "Temptrol Pressure Balancing Shower Valves and Systems," bates Nos. 000051741-000051744, undated.

Symmons Engineering Company, "TempControl Thermostatic Water Controller From Symmons," excerpted pages between bates Nos. 000051769 and 000051780, undated.

Symmons Engineering Company, "Symmons Showeroff," excerpted pages between bates Nos. 000051761 and 000051767, undated.

Symmons Engineering Co., "Temtrol Thermostatic Water Controller Installation and Maintenance Instructions," bates Nos. 000051620-000051623, undated.

Symmons Industries, Inc., "Non-Scald Symmons Safetymix Shower Valve," bates Nos. 000051581-000051599, undated.

Symmons Engineering Co., "Temptrol Positive Thermostatic Water Controller With Replaceable Cartridge," bates Nos. 000051626-000051627, undated.

Symmons Engineering Co., "Installation Instructions for the Safetymix'ette' Series II," bates No. 000051662, undated.

Star X-Ray Company, Inc., "Series 700" Installation and Maintenance Manual, bates Nos. 35224-35227, undated.

Fig. 1 is a check valve manufactured by Neoperl, Inc., 171 Mattatuck Heights, Waterbury, CT 06705.

Fig. 2 is a check valve manufactured by Simmons Manufacturing Company, 1608 Conyers Road, McDonough, GA 30253.

Bradley Corporation, "Navigator Thermostatic Mixing Valves" promotional materials, undated.

* cited by examiner

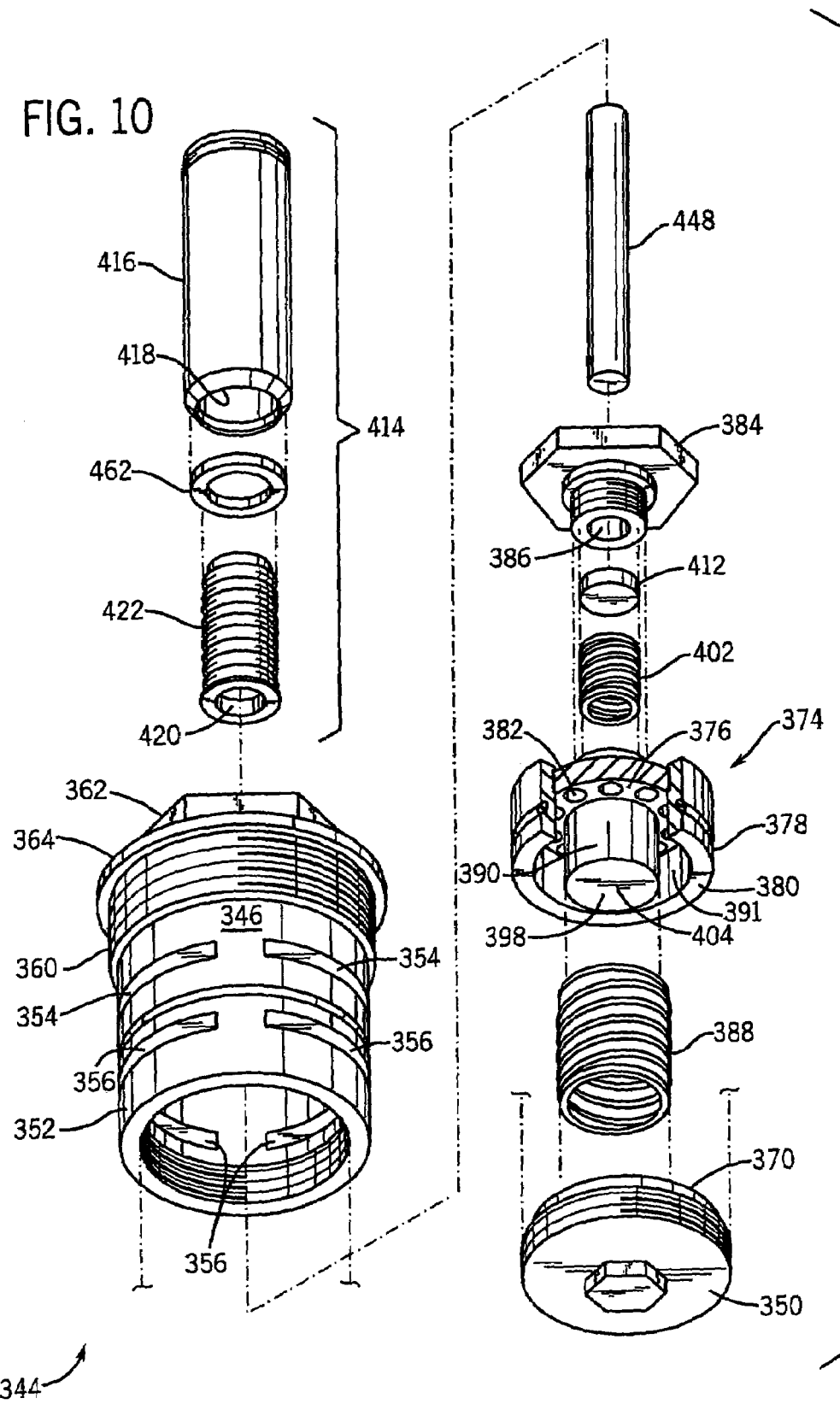

METHOD OF MIXING FLUIDS USING A VALVE

RELATED APPLICATION

The present application is a continuation application of a U.S. patent application Ser. No. 10/378,185 entitled, "METHOD OF MIXING FLUIDS IN A VALVE" filed Mar. 3, 2003 now U.S. Pat. No. 6,851,400, which is a continuation application of then co-pending U.S. Pat. No. 6,543,478 U.S. application Ser. No. 09/941,141 entitled, "THERMOSTATIC MIXING VALVE" filed Aug. 28, 2001, which is a divisional application of then U.S. patent application Ser. No. 09/633,728 now U.S. Pat. No. 6,315,210 entitled, "THERMOSTATIC MIXING VALVE" filed Aug. 7, 2000, which is a continuation of then U.S. patent application Ser. No. 09/165,880 entitled, "THERMOSTATIC MIXING VALVE" filed Oct. 2, 1998 now abandoned, which applications are hereby expressly incorporated by reference herein.

FIELD OF THE INVENTION

The present invention relates to a thermostatic mixing valve.

BACKGROUND OF THE INVENTION

Thermostatic mixing valves are known for the producing of a mixed fluid by combining the supplies of a first (relatively hot) fluid and of a second (relatively cold) fluid. Known arrangements for thermostatic mixing valves generally include a first fluid inlet, a second fluid inlet, a mixed fluid outlet, a mixing chamber, and a thermostatic control device. Known thermostatic mixing valves generally vary the flow rate of at least the first fluid and often also of the second fluid, the temperatures, pressures, and flow rates of both of which are typically not known and may vary randomly during operation, to produce a mixed fluid of a substantially constant temperature.

It would be advantageous to provide for a thermostatic mixing valve to allow relatively high flow rates of first, second, and mixed fluids while incurring only relatively moderate pressure drops within the thermostatic mixing valve. It would also be advantageous for a thermostatic mixing valve to automatically shut off flow of at least a hot fluid upon failure of the thermostatic control device. It would further be advantageous to provide for a thermostatic mixing valve which allows for relatively high flow rates with only moderate pressure drops and which shuts off flow of at least the hot fluid.

SUMMARY OF THE INVENTION

The present invention relates to a thermostatic mixing valve configured to produce a mixed fluid substantially of a particular temperature from the mixing of a first fluid of a temperature higher than or equal to the particular temperature and of a second fluid of a temperature lower than or equal to the particular temperature. The thermostatic mixing valve includes a valve body having a first fluid inlet, a second fluid inlet, and a mixed fluid outlet. The thermostatic mixing valve also includes a valve member configured to control the rate of flow of at least the first fluid. The valve member includes a thermostatic control device in communication with the mixed fluid and a shuttle coupled to the thermostatic control device, configured for movement within a liner, and oriented to adjustably engage the flow of at least the first fluid through at least one opening within a wall of the liner, the direction of movement of the shuttle with respect to the liner defining the major longitudinal axis of the thermostatic mixing valve, the direction of flow of the first fluid being at least partially transverse with respect to the major longitudinal axis of the valve.

The present invention also relates to a thermostatic mixing valve configured to produce a mixed fluid substantially of a particular temperature from a first fluid of a temperature higher than or equal to the particular temperature and a second fluid of a temperature lower than or equal to the particular temperature. The thermostatic mixing valve includes a valve body having a first fluid inlet, a second fluid inlet, and a mixed fluid outlet, and a valve member configured to control the rate of flow of the first fluid and the rate of flow of the second fluid. The valve member includes a thermostatic control device in communication with the mixed fluid and a shuttle coupled to the thermostatic control device, configured for movement within a liner, and oriented to adjustably engage in opposing relationship the flow of the first fluid and the flow of the second fluid, the direction of movement of the shuttle with respect to the liner defining the major longitudinal axis of the thermostatic mixing valve, the directions of flow of the first fluid and the second fluid being at least partially transverse with respect to the major longitudinal axis of the thermostatic mixing valve.

The present invention further relates to a mixing valve configured to produce a mixed fluid from the mixing of a first fluid and at least a second fluid. The mixing valve includes a valve body having a first fluid inlet, at least a second fluid inlet, and a fluid outlet, and at least one fluid inlet including a check valve configured to prevent fluid from flowing out of the valve through the at least one inlet. The check valve includes a first check valve member which is stationary within and with respect to the valve body, a second check valve member which is movable within the valve body in a defined path of motion and engageable with the first check valve member, and a biasing device for urging the second check valve member into engagement with the first check valve member and for defining the path of motion of the second check valve member.

BRIEF DESCRIPTION OF THE DRAWINGS

FIG. 10 is an exploded perspective view of a valve member of the thermostatic mixing valve of FIG. 5.

DETAILED DESCRIPTION OF PREFERRED EMBODIMENTS

FIGS. 1 through 4 show a thermostatic mixing valve according to a preferred embodiment for producing from a first fluid and a second fluid a mixed fluid substantially of a particular temperature which is intermediate the temperatures of the first fluid and the second fluid. The first fluid is higher in temperature than is the second fluid. For ease of understanding, the first fluid is sometimes referred to herein as a hot fluid and the second fluid as a cold fluid (though both may be "hot" or "cold" in terms of human sensory perception and they may be separated by only a relatively small temperature difference).

Figure 1:
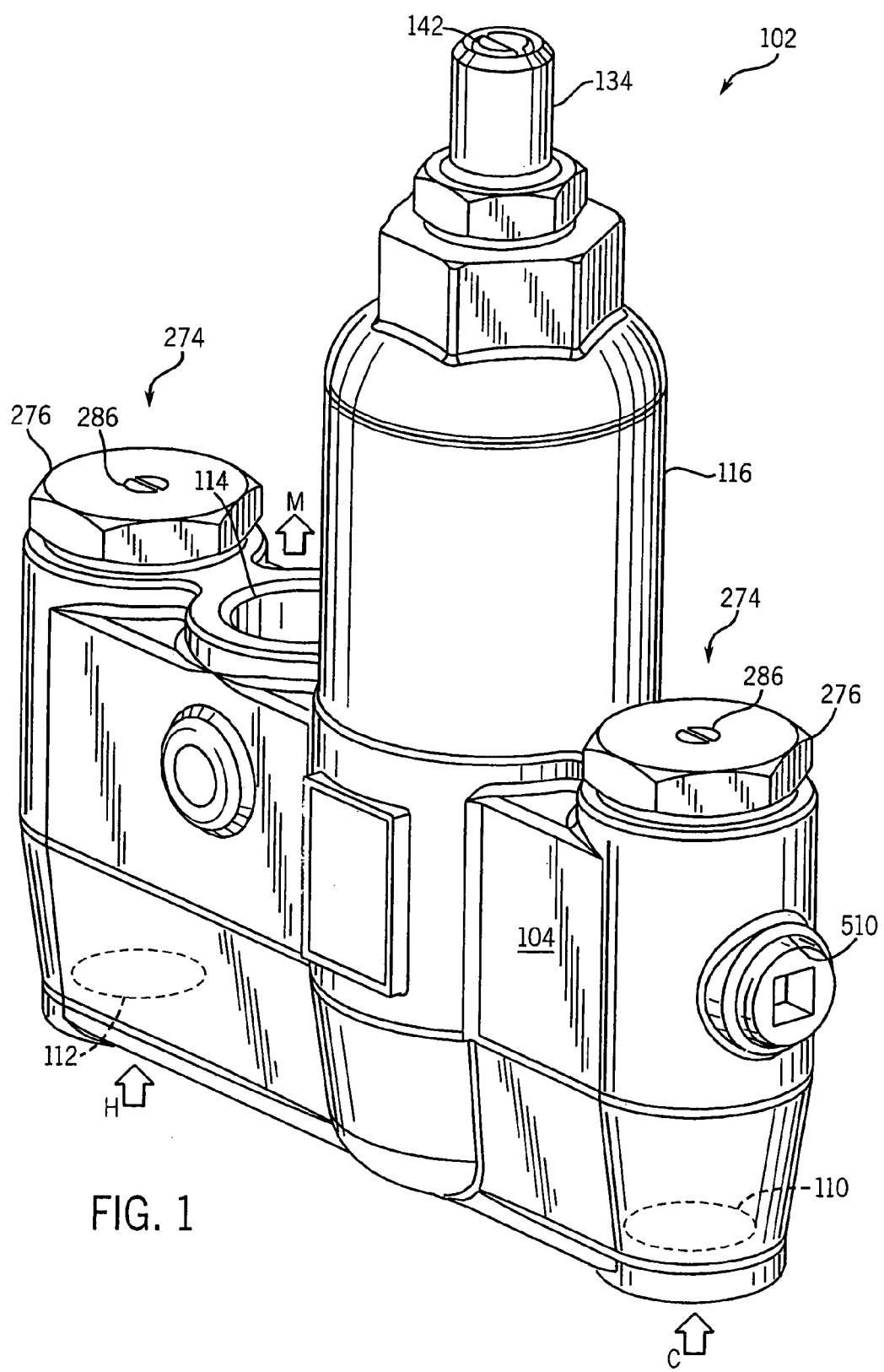
FIG. 1 is a perspective view of a thermostatic mixing valve according to a preferred embodiment of the present invention.

FIG. 1 shows a thermostatic mixing valve 102 having a valve body 104, a cold fluid inlet port 110 associated with a cold fluid inlet designated by the reference letter "C", a hot fluid inlet port 112 associated with a hot fluid inlet designated by the reference letter "H", and a mixed fluid outlet port 114 associated with a mixed fluid outlet designated by the reference letter "M". Thermostatic mixing valve 102 also includes a bonnet 116, a cap 134, and a cover screw 142 for limiting access to an adjusting screw 140 (shown in FIG. 2). Thermostatic mixing valve 102 further includes a first check valve 274 associated with hot fluid inlet H and a second check valve 274 associated with cold fluid inlet C, each check valve 274 including a check valve cap 276 in which is threadedly engaged a stem 286.

Figure 2:
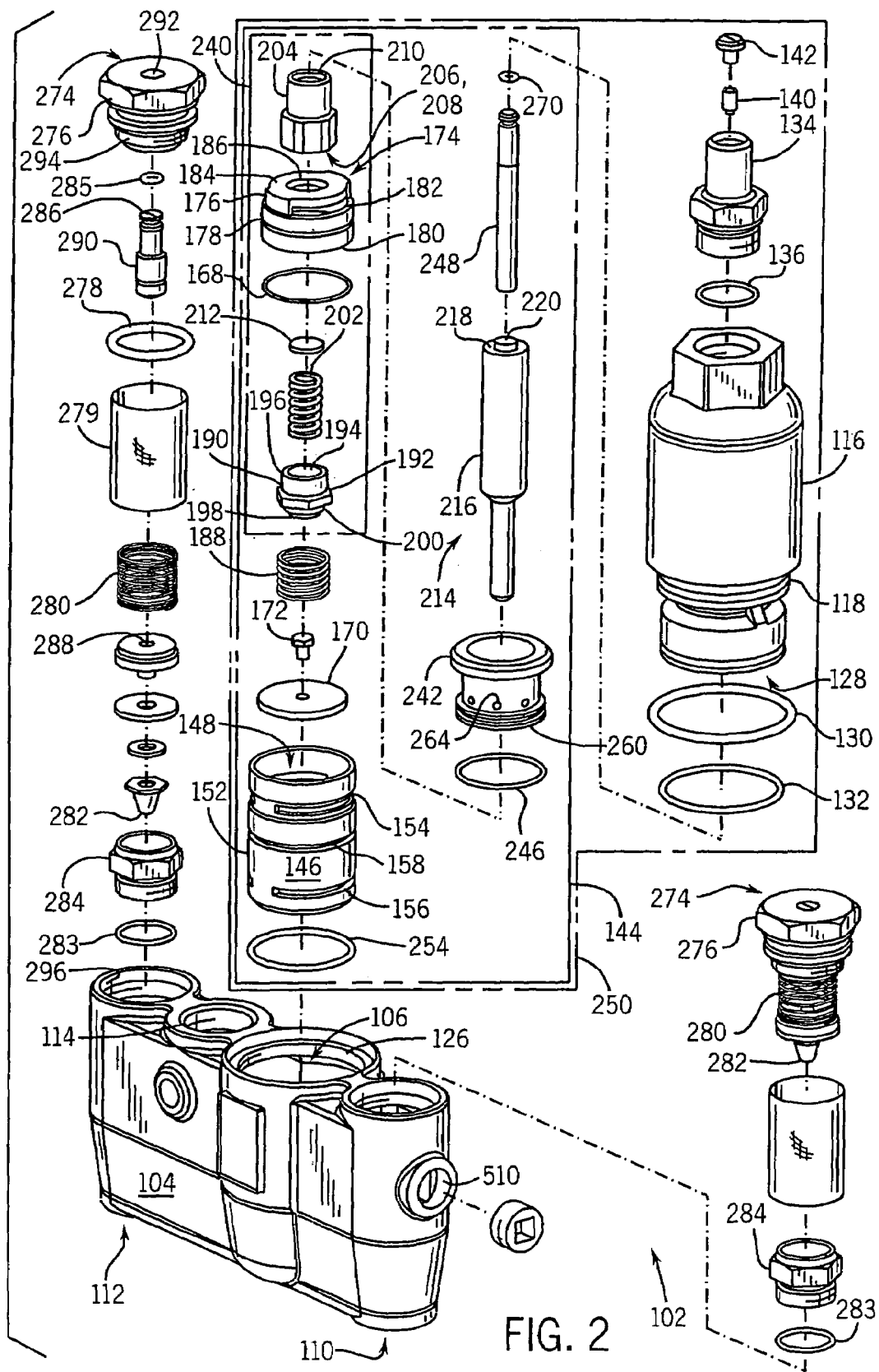
FIG. 2 is an exploded perspective view of the thermostatic mixing valve of FIG. 1.

FIG. 2 shows valve body 104 including cold fluid inlet port 110, hot fluid inlet port 112, and mixed fluid outlet port 114. Ports 110, 112, and 114 are configured for the connecting and seating of appropriate fluid conduits (e.g., using pipe threads) to valve body 104. A check valve 274 is assembled to valve body 104 in association with each inlet port 110 and 112. Check valve 274 includes a seat 284, a plug 282, a check valve cap 276, a stem 286, a cylindrical filter screen 279, and a biasing spring 280. Check valve cap 276 is provided with threads 294 for engagement with threaded aperture 296 within valve body 104, and is sealed to valve body 104 with an annular seal 278. Stem 286 is provided with threads 290 for engagement with a threaded aperture 292 centrally located within check valve cap 276, and is sealed to check valve cap 276 by an annular seal 285.

Valve body 104 further includes a cavity 106 for the receiving of a valve member 144. Valve body 104, valve cap 134, adjusting screw 140, and cover screw 142 may be made of various materials. According to any particularly preferred embodiment, valve body 104 and valve cap 134 are cast of brass, gray iron, or ductile iron, and adjusting screw 140 and cover screw 142 are machined of brass, bronze, or stainless steel.

Figure 3:
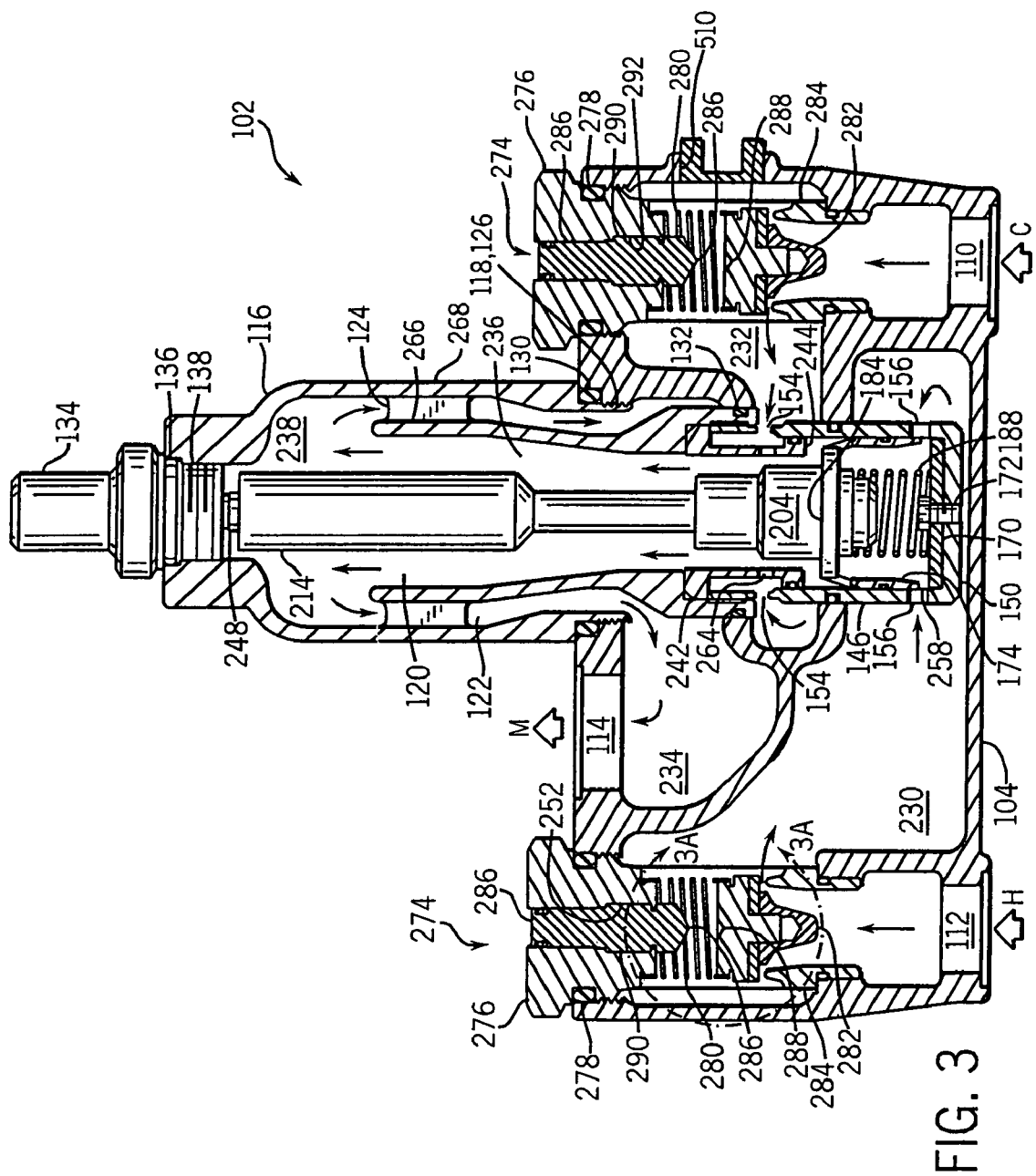
FIG. 3 is a front sectional elevation view of the thermostatic mixing valve of FIG. 3.

A liner 146 is configured generally as a hollow cylinder having a side wall 152 and a lower end closed by a bottom wall 150 (shown in FIG. 3). Liner 146 further includes at least one transversely oriented upper opening 154 and at least one transversely oriented lower opening 156 for flow of cold and hot fluids, respectively, through side wall 152. A circumferential groove 158 within the outer surface of side wall 152 is provided for a seal 254. A seat 170 is secured to the inner surface of bottom wall 150 of liner 146 by a screw 172, for seating of a lower edge 180 of a side wall 178 of a shuttle 174 and of a biasing spring 188.

The position of shuttle 174 is adjustable within liner 146. The orientation of sliding movement of shuttle 174 within liner 146 of valve member 144 defines the major longitudinal axis of valve member 144, and hence of thermostatic mixing valve 102. The upper end of biasing spring 188 is transversely restrained (or piloted) by a lower end 198 of a spring pilot 190 having a generally cylindrical shape, and is longitudinally restrained by a flange 192 circumscribing the outer surface or spring pilot 190. Flange 192 is shown in a hexagonal configuration to provide wrench flats 200 for threaded assembly to a shuttle 174 and to a relief spring holder 204, shown in FIGS. 4A to 4D. An upper end of spring pilot 190 includes a cavity 194 for the receiving and retaining of the lower end of a relief spring 202. An upper end of relief spring 202, and a disc 212 for spreading the axial load of relief spring 202 upon a lower end of a thermostat 214, is received and retained within a cavity 206 oriented within a lower end of relief spring holder 204.

In assembly of valve member 144, a first valve member subassembly 240 is made by inserting disc 212 into cavity 206 within the bottom of relief spring holder 204, inserting a first end of relief spring 202 into cavity 206 and upon disc 212, placing shuttle 174 upon the bottom of relief spring holder 204 so that a second end of relief spring 202 projects through an opening 186 within the upper surface of shuttle 134, inserting the second end of relief spring 202 into cavity 194 of spring pilot 190, and using wrench flats 200 of spring pilot 190 to fully engage threads 196 of spring pilot 190 with mating threads 208 within cavity 206 of relief spring holder 204. This secures relief spring holder 204, disc 212, relief spring 202, shuttle 174, and spring pilot 190 together, with the top surface of shuttle 174 and relief spring 202 being clamped between a top surface of cavity 206 of relief spring holder 204 and a bottom surface of cavity 194 of spring pilot 190 to form first valve member subassembly 240.

An insert 242 is provided with a seal 246 which is seated within a peripheral groove located near a lower end of insert 242. As shown in FIGS. 3 and 4A through 4D, insert 242 is inserted into an upper end of liner 146 during assembly of valve member 144, and seal 246 separates cold fluid from hot fluid within valve member 144. Insert 242 includes at least one opening 264 for passage of cold fluid, as shown in FIGS. 3 and 4A through 4D. Insert 242 is held in position within a lower portion of bonnet 116 by liner 146, which clamps insert 242 when liner threads 160 are engaged with mating threads within an opening 128 of bonnet 116.

Referring again to FIG. 2, seat 170, screw 172, seal 254, insert 242, and seal 246 are preassembled to liner 146, after which biasing spring 188 and first subassembly 240 are placed within the open end of liner 146. A stem 248 is loosely received within a bellows 222 (shown in FIGS. 4A through 4D) of thermostat 214, whereupon thermostat 214 with stem 248 is inserted through an opening 210 in a top surface of relief spring holder 204 to bear upon disc 212 (contained within first subassembly 240).

Valve member 144 is installed to opening 128 in a lower end of bonnet 116 using mating threads 160 and 162. A seal 270 seals stem 248 to an aperture 249 within valve cap 134. A second valve member subassembly 250 is then formed by further assembling to bonnet 116 a seal 130 and a seal 132, valve cap 134 with a seal 136 using threads 138, adjusting screw 140, and cover screw 142. Assembly of the thermostatic mixing valve is then completed by installing second valve member subassembly 250 to cavity 106 of valve body 104 by engaging threads 118 of bonnet 116 with threads 126 within the opening to cavity 106 of valve body 104.

FIG. 3 shows a plurality of chambers formed within valve body 104 and valve member 144 of the thermostatic mixing valve. A hot fluid chamber 230 is in communication with hot fluid inlet port 112, and a cold fluid chamber 232 is in communication with cold fluid inlet port 110. Both hot fluid chamber 230 and cold fluid chamber 232 are open to valve member 144. An inner passage 120 of bonnet 116 includes a preliminary mixing chamber 236, which is in communication with a main mixing chamber 238, which is in turn in communication with a mixed fluid outlet chamber 234, itself in communication with mixed fluid outlet port 114. Inner passage 120 and an outer passage 122 of bonnet 116 are separated by an annular inner bonnet wall 266 (which is coupled at a fixed distance from an annular outer bonnet wall 268 by at least two webs 124 (three, or four, are included in any particularly preferred embodiment for structural rigidity) oriented radially within outer passage 122, having a thickness sufficient to structurally couple inner bonnet wall 266 to outer bonnet wall 268). Webs 124 are configured with a streamlined cross section having its greater dimension oriented vertically, in order to minimize obstruction of flow of mixed fluid.

FIG. 4A–D show a thermostatic control device shown as thermostat 214 having a thermostat housing 216 is installed within both preliminary mixing chamber 236 and main mixing chamber 238, which provides a large heat flow area for thermal convection to, and thermal conduction through, the walls of thermostat housing 216. According to a particularly preferred embodiment, thermostat housing 216 includes at least one thin wall made of a material having a high coefficient of thermal conductivity (e.g., a copper alloy) in order to provide a low thermal impedance to a thermally responsive material 226 contained within thermostat housing 216. Thermally responsive material 226 has a large coefficient of thermal expansion, and therefore expands substantially upon increasing in temperature and contracts substantially upon decreasing in temperature. Expansion upon increase in temperature increases a force exerted upon bellows 222 located within thermostat housing 216.

Various substances are known to those skilled in the art for use as thermally responsive material 226. According to an embodiment particularly preferred for economy of manufacture, an acetone is used for a thermally responsive material. According to an alternative embodiment particularly preferred for high performance when economy is a less important factor, a halogenated fluorocarbon such as MS-782 Vertrel XF manufactured and distributed by Miller-Stephenson Chemical of Danbury, Conn. is used for a thermally responsive material.

Bellows 222 is constructed in a manner (e.g., using circumferentially corrugated metal) which causes it to be radially stiff but longitudinally flexible. Bellows 222 has a closed end 224 located within thermostat housing 216, and an open end 220 which is secured to an open end 218 of thermostat housing 216. The periphery of the opening in open end 220 of bellows 222 may be sealed to the open end of thermostat housing 216 to prevent loss of thermally responsive material 226.

Stem 248, of generally cylindrical shape and a diameter which is slightly smaller than is the minimum inside diameter of bellows 222, is placed within bellows 222 through open end 220. An increase in temperature of thermostat 214, caused by an increase in temperature of the mixed fluid surrounding thermostat 214, causes an expansion of thermally responsive material 226 filling the space between the inner surfaces of thermostat housing 216 and the outer surfaces of bellows 222, increasing a longitudinally oriented control force exerted upon closed end 224 of bellows 222 and thereby upon stem 248, in a direction which tends to extend stem 248 out of thermostat 214, and to thereby increase the combined lengths of thermostat 214 and stem 248.

Upwardly oriented movement of stem 248 is prevented by adjusting screw 140 within valve cap 134, so that any motion which occurs will be of thermostat 214 pressing against either relief spring 202 through disk 212 within first subassembly 240 or of thermostat 214 and first assembly 240 pressing against biasing spring 188. Relief spring 202 is stiffer (i.e., has a higher spring rate) than is biasing spring 188, so extension of stem 248 out of thermostat 214 results in a displacement of thermostat 214 vertically downward and an increase in compression of biasing spring 188, the compressive force of biasing spring 188 balancing the force caused by the expansion of thermally responsive material 226 within thermostat 214. Shuttle 174 is thereby displaced downwardly within liner 146, decreasing open area associated with a hot fluid metering gap 258 of lower opening 156 and consequently flow rate of the hot fluid.

The setpoint temperature to which thermostat 214 controls is primarily a function of properties of thermally responsive material 226 and force of biasing spring 188, which is influenced by the position of adjusting screw 140. In any particularly preferred embodiment, such design parameters of the valve are selected by the valve designer and manufacturer so that, in normal operation of the valve using hot and cold fluid sources of typical pressures and temperatures, a desired mixed fluid outlet temperature can be obtained with adjusting screw 140 at or near the center of its range of screw thread travel. When adjusting screw 140 is rotated in a clockwise direction (assuming a right-hand thread) to a position farther within valve cap 134, it decreases the setpoint temperature by reducing the open area of lower openings 156 and thereby the flow rate of the hot fluid. Conversely, rotating adjusting screw 140 in an opposite direction to a position nearer the top of valve cap 134 similarly increases the setpoint temperature. Unauthorized tampering with adjusting screw 140 is discouraged by concealing adjusting screw 140 beneath a cover screw 142.

Shuttle 174 and liner 146 thus cooperate to function as a hot fluid metering valve element. Because of the large diameter of the liner, wherein are located flow control openings 156, relative to diameters of flow control openings of the poppet, plug, or globe types of valve element used in thermostatic control valves prior to the present invention, the cumulative open area of lower openings 156 is larger than is the open area of a comparably nominally sized metering valve of the poppet, plug, or globe types, allowing a greater amount of flow at any given pressure drop through thermostatic mixing valve 102. A small change in position of shuttle 174 with respect to liner 146 in a preferred embodiment correspondingly results in a comparably greater change in flow rate of hot fluid than does a similar change in position of a hot fluid flow metering element in a thermostatic mixing valve of the poppet, plug, or globe type.

According to a particularly preferred embodiment (by way of example and not of limitation), of a thermostatic mixing valve, ports 110 and 112 are of 1 inch nominal pipe size and 114 is of 1-¼ inch nominal pipe size. Liner 146 is of approximately 1.491/1.492 inch inside diameter. Two lower openings 156 within the wall of liner 146 are spaced approximately 0.48 inch from two upper openings 154. Each opening 154, 156 is configured as a slot cut through the wall of liner 146, subtends an angle of approximately 145 degrees, and is approximately 0.13 inch in height, for hot and cold fluid flow areas at liner 146 of approximately 0.49 square inch, respectively. Testing of the thermostatic mixing valve using hot cap water of approximately 160 degrees Fahrenheit (F.) and cold tap water of approximately 55 degrees F. produced the results shown in TABLE 1 below, with a valve shuttle and stem stroked manually and controllably. The term "$C_v$" is a measure of valve flow capacity at a given pressure drop across a valve and is taken from the relationship $Q=C_v*(\Delta p)^{1/2}$, wherein "Q" designates flow rare in U.S. gallons per minute (gpm) and "$\Delta p$" designates pressure drop in pounds per square inch (psi).

TABLE 1

| Shuttle And Stern Stroke (inches) | Hot Water Flow Rate (gpm) | Hot Water $\Delta p$ (psi) | Cold Water Flow Rate (gpm) | Cold Water $\Delta p$ (psi) | Valve Flow Capacity (Total $C_v$) |
| --- | --- | --- | --- | --- | --- |
| 0 | 4.9 | 55 | 51.0 | 20 | 12.0 |
| 0.0093 | 11.1 | 55 | 48.4 | 20 | 12.3 |
| 0.0186 | 16.6 | 52 | 47.1 | 22 | 12.3 |
| 0.0279 | 22.7 | 42 | 44.5 | 24 | 12.6 |
| 0.0372 | 27.1 | 35 | 42.1 | 26 | 12.7 |
| 0.0465 | 28.2 | 30 | 40.6 | 28 | 12.8 |
| 0.0558 | 30.5 | 25 | 38.6 | 30 | 13.1 |
| 0.0651 | 31.7 | 21 | 34.9 | 33 | 13.0 |
| 0.0744 | 23.9 | 20 | 31.1 | 35 | 12.8 |
| 0.0837 | 35.9 | 16 | 29.3 | 40 | 12.7 |
| 0.0930 | 36.2 | 14 | 19.8 | 45 | 12.6 |
| 0.1023 | 36.5 | 11 | 13.3 | 50 | 12.8 |

The direction of movement of shuttle 174 within liner 146 is perpendicular to that of the fluid being metered, the fluid therefore not exerting a stagnation or velocity pressure against the face of shuttle 174 as it does against the flow control element of a poppet, plug, or globe valve. This enables control of higher flow rates at higher velocities and pressures using a smaller thermostat than is possible with thermostatic valve of the previously used poppet, plug, or globe types. Liner 146 is closed at its bottom end by a bottom wall 150 but has an opening 148 at its upper end, allowing the hot fluid to flow upwardly through the interior of shuttle 174 and passages 182 of shuttle 174. Passages 182 are formed by a displacement of a top portion 184 of shuttle 174 from side wall 178 of shuttle 174, top portion 184 being held in fixed relationship to side wall 178 by a web 176 of shuttle 174.

FIG. 3 shows check valve 274 is an installed and operating condition (see FIG. 2 for exploded view). Spring 280 holds plug 282 against seat 284 in an absence of flow of mixed fluid from mixed fluid outlet M, fluid pressures being equal on both sides of plug 282 when there is no flow. When mixed fluid M is desired and flow is allowed from mixed fluid outlet M, back pressure drops on the downstream side of plug 282 and inlet supply pressure forces plug 282 upwardly compressing spring 280 by a distance corresponding to the pressure difference across plug 282. Spring 280 is configured to have a high lateral stiffness, so that it may not only serve to urge plug 282 against seat 284 but may also guide plug 282 in its path of motion between the opened and closed states of check valve 274.

Figure 3A:
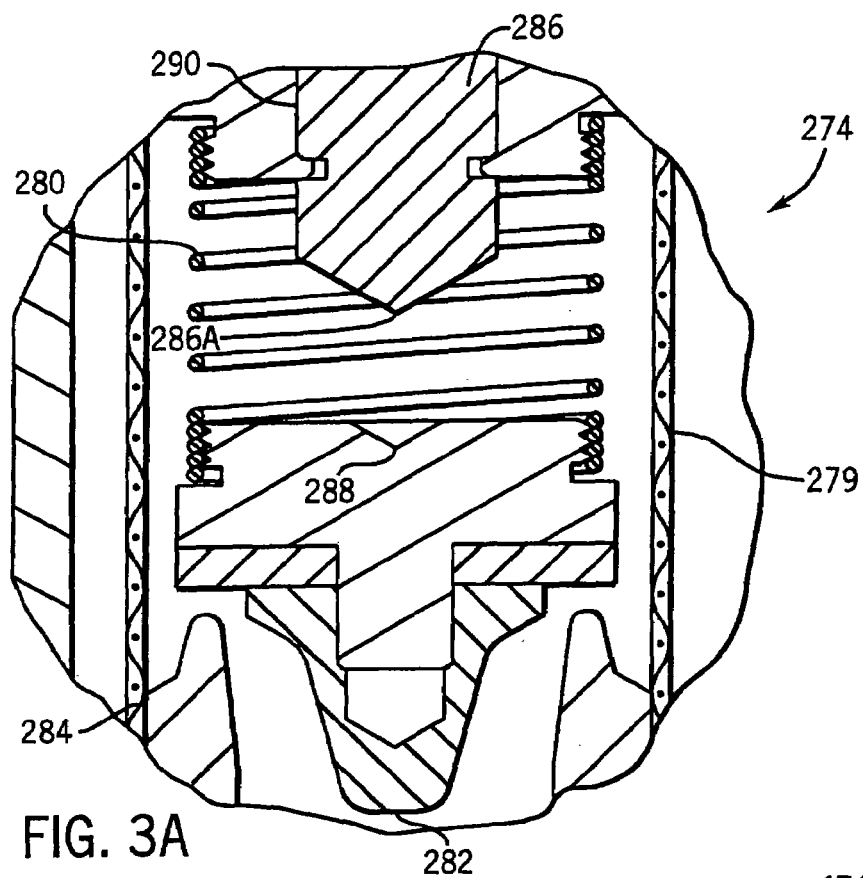
FIG. 3A is a fragmentary elevation view of the thermostatic mixing valve of FIG. 3.

FIG. 3A is a detail of a portion of check valve 274 shown in FIGS. 2 and 3. Stem 286 is provided a tip 286a of a particular size and shape, and plug 282 is provided a recess 288 which coacts with tip 286a. These are included to maintain the position of plug 282 centrally located within check valve 274 during conditions of high flow rate and correspondingly high fluid velocity, When plug 282 is forced fully upward and plug 282, with the associated end of spring 280, may otherwise be dragged toward the center of thermostatic mixing valve 102 by drag of the high-velocity fluid. (Check valve 274 may also include other associated seals (such as annular seal 283) and washers.) For configuring of check valves 274 for operation of thermostatic mixing valve 102, the position of threaded stem 286 within check valve cap 276 is adjusted upwardly as shown to provide plug 282 room to move upward. For service or maintenance of thermostatic mixing valve 102, stem 286 may be turned to advance it downwardly and thereby force plug 282 against seat 284 and close off the associated inlet of thermostatic mixing valve 102.

FIGS. 4A, 4B, 4C, and 4D illustrate the operation of thermostatic mixing valve 102 in various conditions of operation.

Figure 4A:
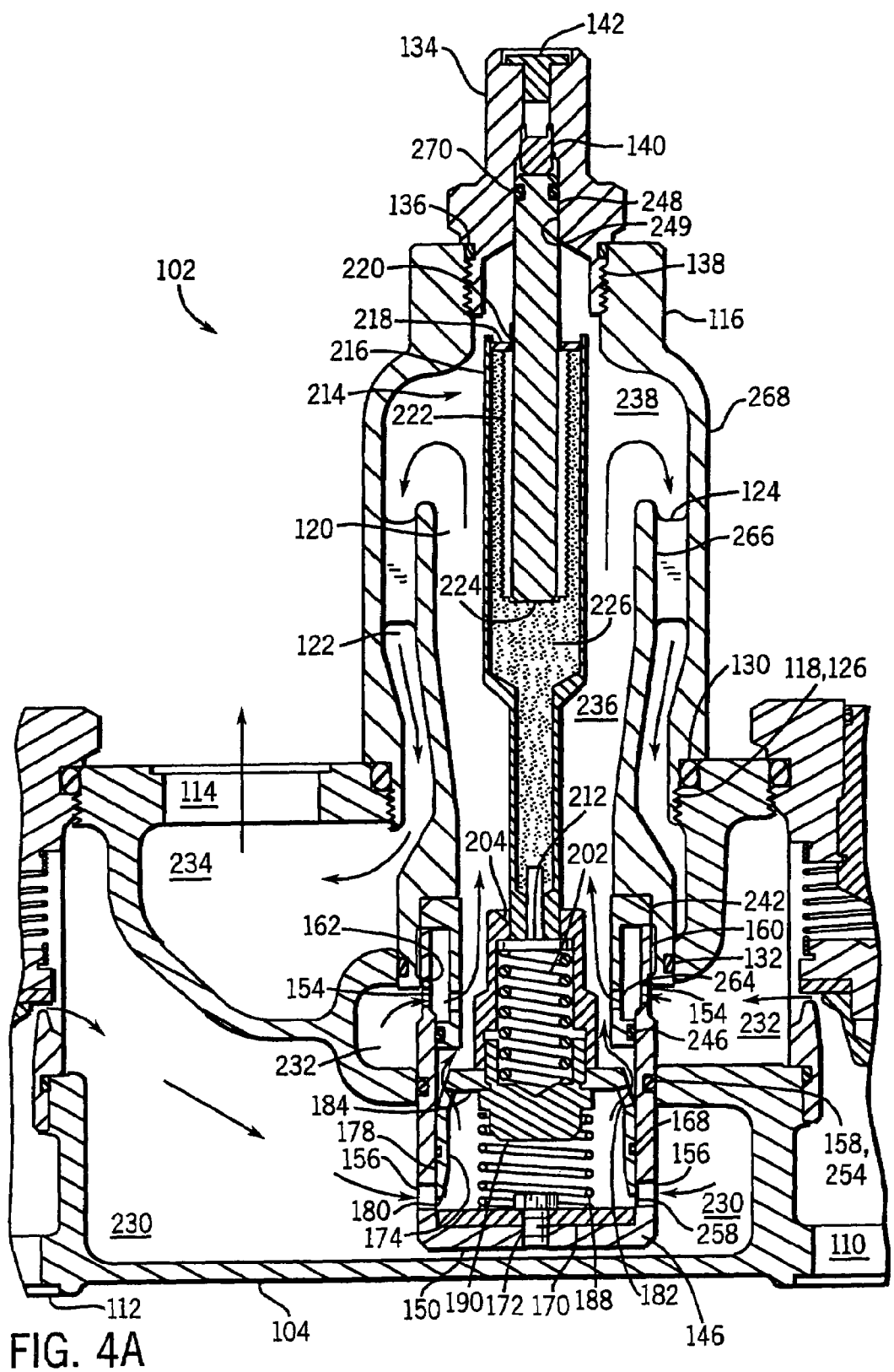
FIG. 4A is a front sectional elevation view of the thermostatic mixing valve of FIG. 1 showing full cold fluid flow and partial hot fluid flow.

FIG. 4A shows thermostatic mixing valve 102 in normal operation, with shuttle 174 intermediately oriented within liner 146. Cold fluid from cold fluid inlet port 110 flows through upper opening 154 of liner 146 and into preliminary mixing chamber 236, and hot fluid from hot fluid inlet port 112 flows through lower opening 156 of liner 146 and through an at least one passage 182 of shuttle 174 into preliminary mixing chamber 230. Mixing of the hot and cold fluids begins prior to flowing into preliminary mixing chamber 236, continues in preliminary mixing chamber 236, and is completed within main mixing chamber 238. Thermostat 214 is immersed in the mixed fluid at a particular temperature within main mixing chamber 238, and thermally responsive material 226 is at substantially the same temperature due to the effects of heat transfer (thermal conduction and convection) at the wall of thermostat housing 216. Thermally responsive material 226 will thermostat housing 216, and therefore bellows 222, are neither fully contacted nor fully expanded, nor is biasing spring 188 fully extended or fully contacted.

In normal operation the temperature of the mixed fluid is controlled by the longitudinal position of shuttle 174 within and with respect to liner 146, which is in turn controlled by the corresponding specific volume of thermally responsive material 226 at that temperature and by the opposing force of biasing spring 188, the latter corresponding to the position of adjusting screw 140. The open area of a hot fluid metering gap 258 at lower openings 156, and thereby the rate of flow through them, is metered by the longitudinal position of shuttle 174 and thereby by the amount that the side wall 178 of shuttle 174 overlaps and covers lower openings 156. The flow of hot fluid continues in an upwardly oriented direction into preliminary mixing chamber 236. Hot fluid is kept separated from cold fluid before leaving upper openings 154 and lower opening 156 of liner 146 by a shuttle seal 168 oriented within a peripherally oriented groove within side wall 173 of shuttle 174.

Cold fluid similarly enters valve body 104 through cold fluid inlet port 110 and fills cold fluid inlet chamber 232. Cold fluid then flows through transversely oriented openings, shown as upper openings 154, which penetrate the wall of liner 146, and immediately thereafter through similarly oriented transverse openings 264 penetrating a wall of insert 242. Cold fluid then flows upwardly, meeting and mixing with hot fluid. The at least partially mixed fluid proceeds upwardly through preliminary mixing chamber 236 within bonnet inner passage 120 into main mixing chamber 238, flowing over the surface of thermostat housing 216 of thermostat 214 as it does so and thereby maintaining thermally responsive material 226 within thermostat housing 216 at a temperature substantially equal to that of the mixed fluid. Mixed fluid then flows downwardly through an outer bonnet passage 122 into a mixed fluid outlet chamber 234, from which it exits the thermostatic ring valve through mixed fluid outlet port 114.

Figure 4B:
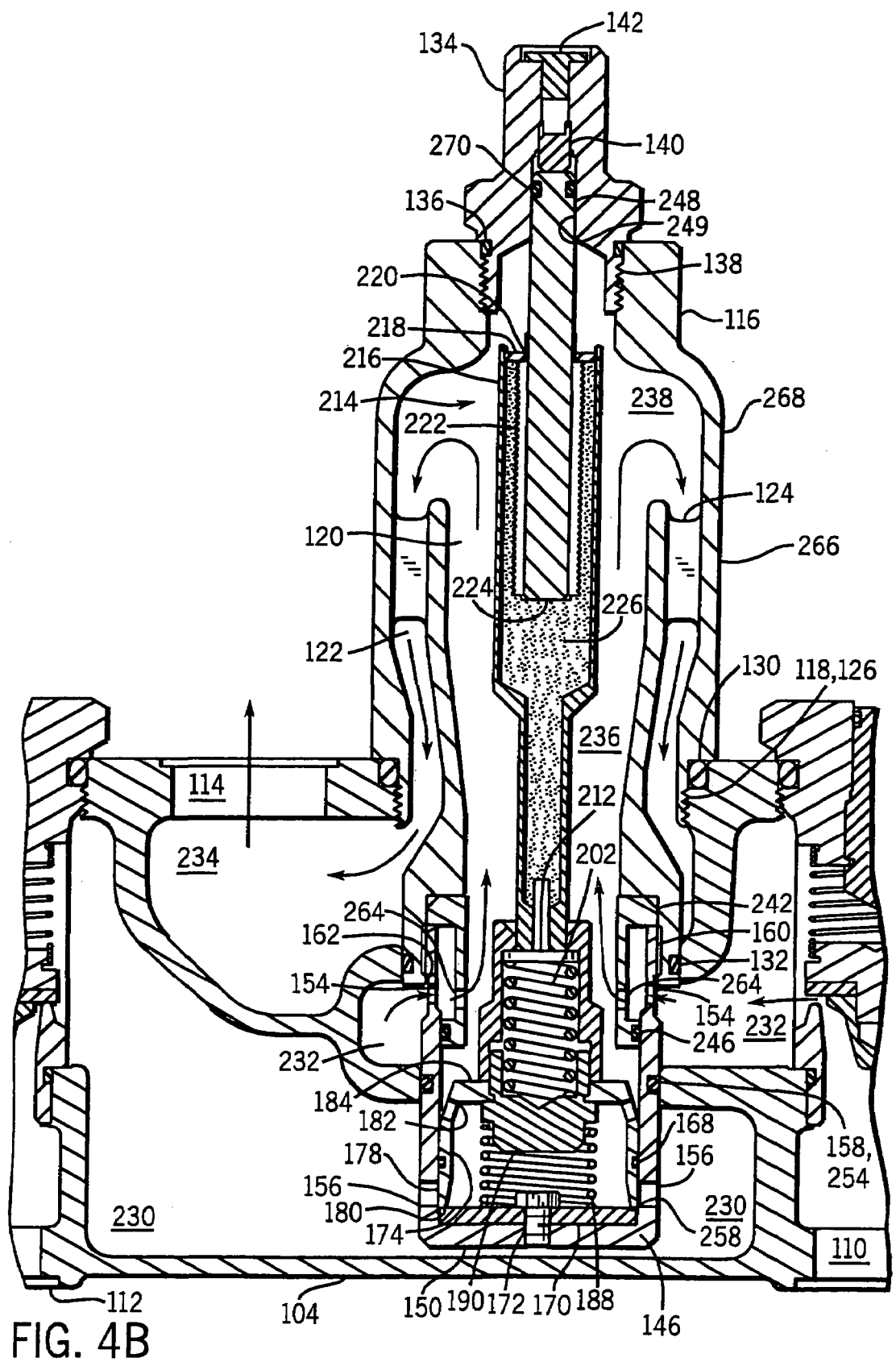
FIG. 4B is a front sectional elevation view of the thermostatic mixing valve of FIG. 1 showing cold fluid flow.

FIG. 4B shows a condition of operation in which the mixed fluid has become too hot (e.g. caused by a large increase in temperature or supply pressure of the hot fluid) and thermally responsive material 226 has therefore expanded. This has forced thermostat 214, and thereby lower edge 180 of side wall 178 of shuttle 174, downward onto seat 170, completely covering lower openings 156 to decrease the hot fluid metering gap to substantially zero and substantially stopping flow of hot fluid. Because lower edge 180 is now abutting seat 170, biasing spring 188 can be compressed no farther. To prevent thermostat housing 216 and/or bellows 222 from rupturing due to excessive expansion of thermally responsive material 226 caused by excessively high temperature of the mixed fluid, relief spring 202 allows additional extension of stem 248 from thermostat 214 by compressing in response to the expansion of thermally responsive material 226, thus relieving excessive force otherwise exerted by thermally responsive material 226.

Figure 4C:
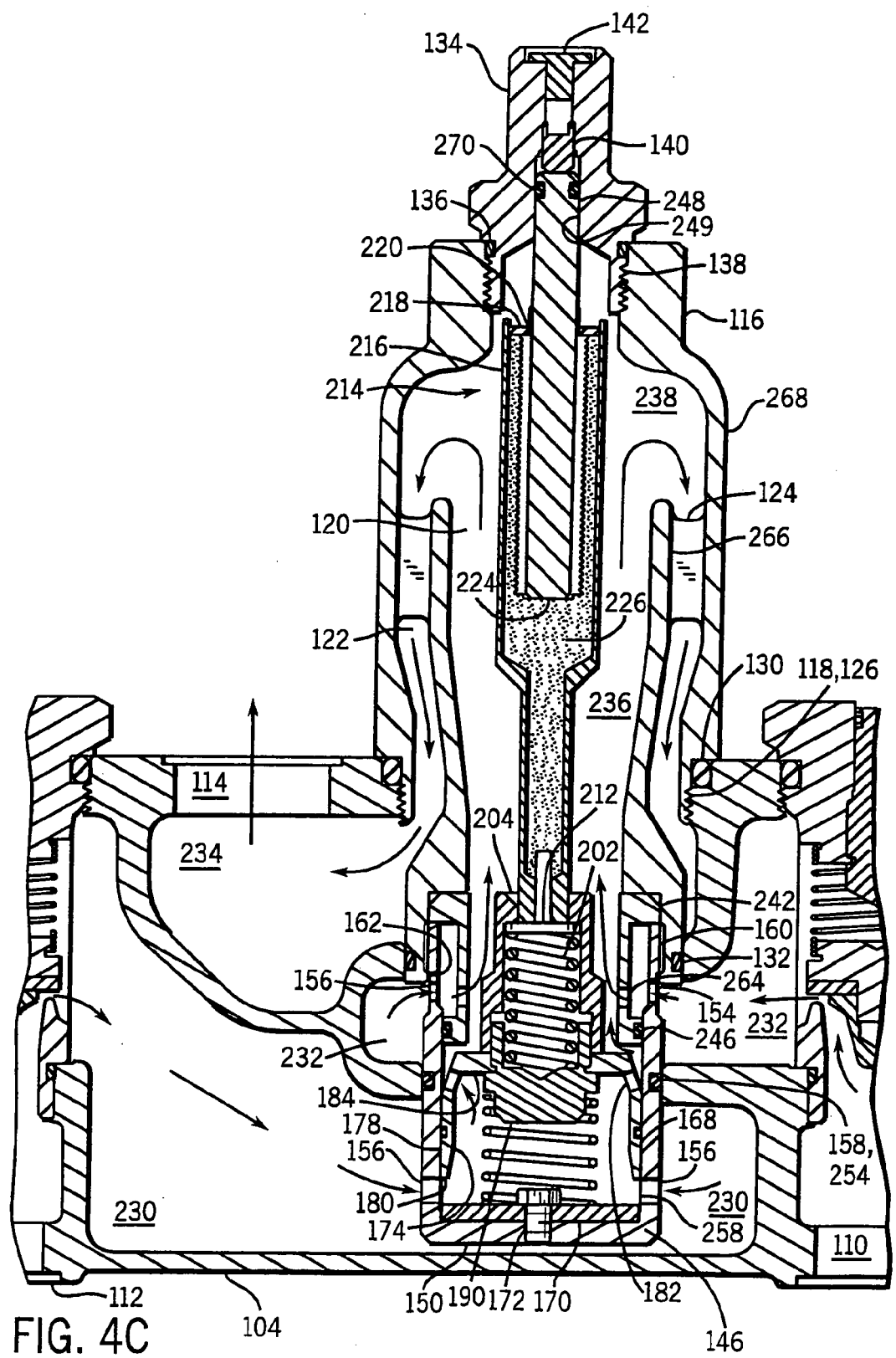
FIG. 4C is a front sectional elevation view of the thermostatic mixing valve of FIG. 1 showing full flow of both hot fluid and cold fluid.

FIG. 4C shows a condition of operation in which the temperature of the mixed fluid has become too cold (e.g., caused by a large reduction in temperature and/or supply pressure of the hot fluid). Thermally responsive material 226 has cooled in response to the reduced temperature of the mixed fluid surrounding thermostat 214, and has contracted and has reduced the force it exerts upon biasing spring 188 through thermostat 214 and first assembly 240. This allows biasing spring 188 to lift first subassembly 240 and thermostat 214, maintaining the abutting relationship between stem 248 and adjusting screw 140. Shuttle 174 is a member of first subassembly 240, and is therefore lifted with it, increasing the hot fluid metering gap of lower openings 156 fully. Hot fluid flow rate thereby increases and relieves the excessively cold condition of the mixed fluid, bringing valve member 144 back into equilibrium.

Figure 4D:
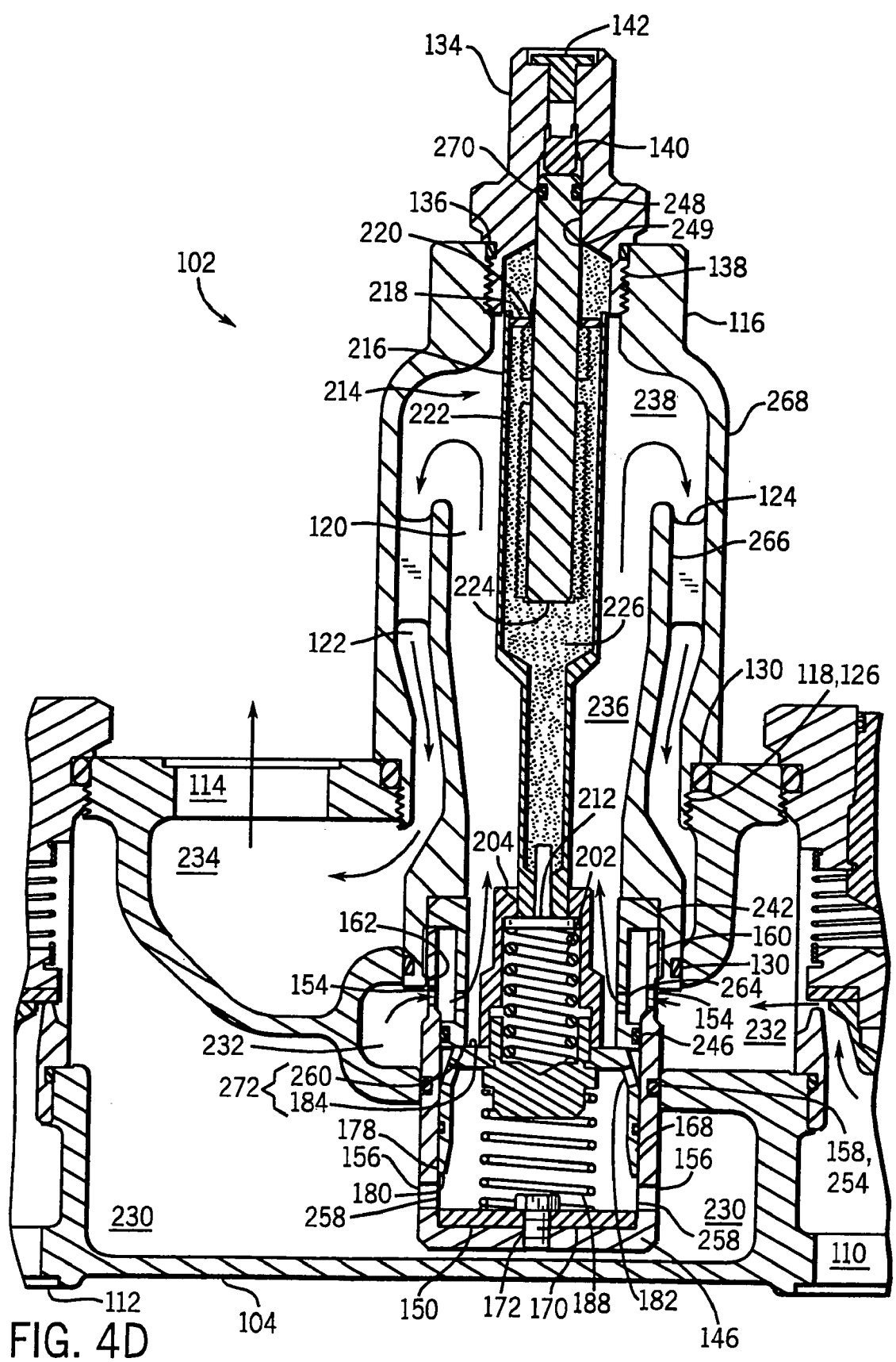
FIG. 4D is front sectional elevation view of the thermostatic valve of FIG. 1 showing the thermostat having failed and flow of only cold fluid.

FIG. 4D shows an abnormal condition of operation which is encountered when thermostat 214 fails to function, in the illustrated instance due to leakage of thermally responsive material 226 through a rupture in bellows 222. Since thermostat 214 is now unable to retain thermally responsive material 226 within housing 216, spring 188 forces thermostat 214 and first subassembly 240 upward until stopped by abutting of a top surface of top portion 184 of shuttle 174 upon a lower surface, or an auxiliary seat 260, of insert 242. Although this fully opens lower openings 156 for maximum flow rate of hot fluid, the abutting of shuttle 174 top portion 184 upon auxiliary seat 260 constitutes closure of a backup shutoff valve 272 and prevents hot fluid from flowing beyond shuttle 174 into preliminary mixing chamber 236. Cold fluid, however, continues to flow unimpeded and unabated. Therefore, a failure of thermostat 214 results in a condition of an emergency shower bath remaining available (with cold fluid only) in spite of a failure of thermostat 214.

FIGS. 5 through 10 show an alternative embodiment of the thermostatic mixing valve for the producing of a mixed fluid of a particular temperature from a cold fluid and a hot fluid, wherein all flow (i.e., flow of the cold fluid, the hot fluid, and mixed fluid) is stopped upon failure of the thermostatic control device (e.g., shown as a device which changes in length upon a change in temperature of a fluid in which the device is at least partially immersed).

Figure 5:
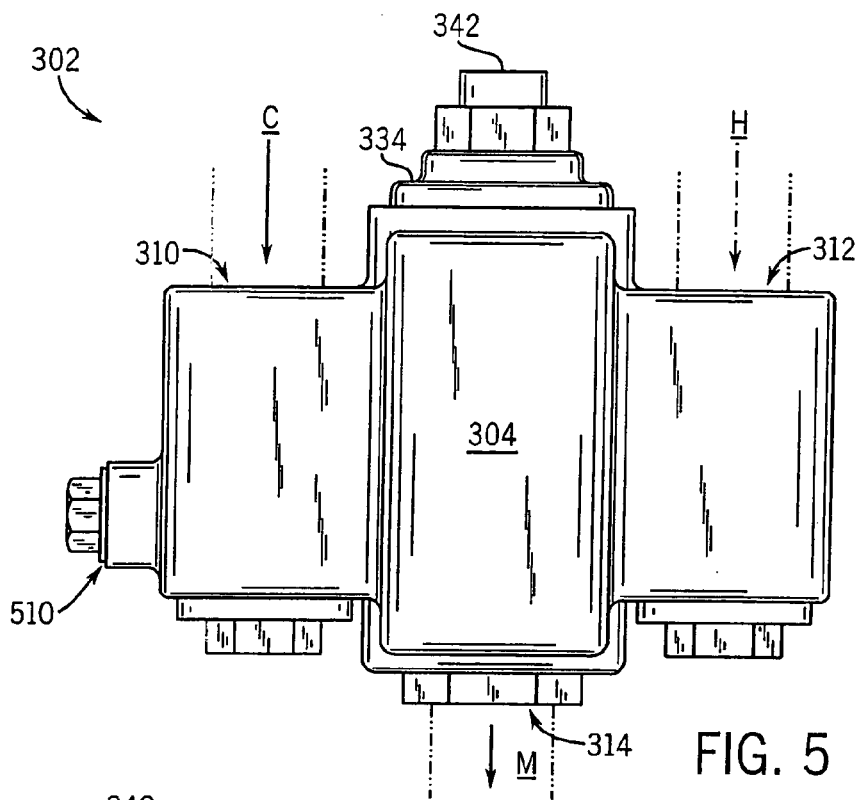
FIG. 5 is a front elevation view of the thermostatic mixing valve according to an alternative embodiment.
Figure 6:
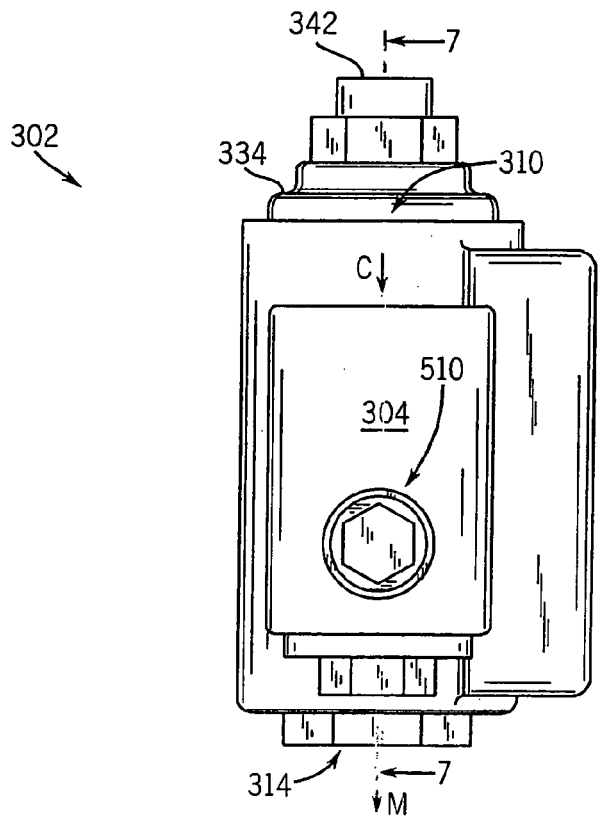
FIG. 6 is a left side elevation view of the thermostatic mixing valve of FIG. 5.

FIGS. 5 and 6 show the alternative embodiment of a thermostatic mixing valve 302 including a valve body 304 having a cold fluid inlet port 310 and a hot fluid inlet port 312 (given reference letters C and H, respectively) and a single mixed fluid outlet port 314 (given a reference letter M). Ports 312, 310, and 314 are configured for sealably connecting fluid conduits (e.g., using pipe threads). A valve cap 334 is mounted upon the top of valve body 304, and holds an adjusting screw 340 and a cover screw 342, both shown in FIG. 7. Thermostatic mixing valve 302 further includes a first check valve 474 associated with hot fluid inlet H and a second check valve 474 associated with cold fluid inlet C, each check valve 474 including a check valve cap 476 in which is threadedly engaged a stem 486.

Valve body 304, valve cap 334, adjusting screw 340, and cover screw 342 may be made of various materials. According to any preferred embodiment, valve body 304 and valve cap 334 are cast of brass, gray iron, or ductile iron, and adjusting screw 340 and cover screw 342 are machined of brass, bronze, or stainless steel.

Figure 7A:
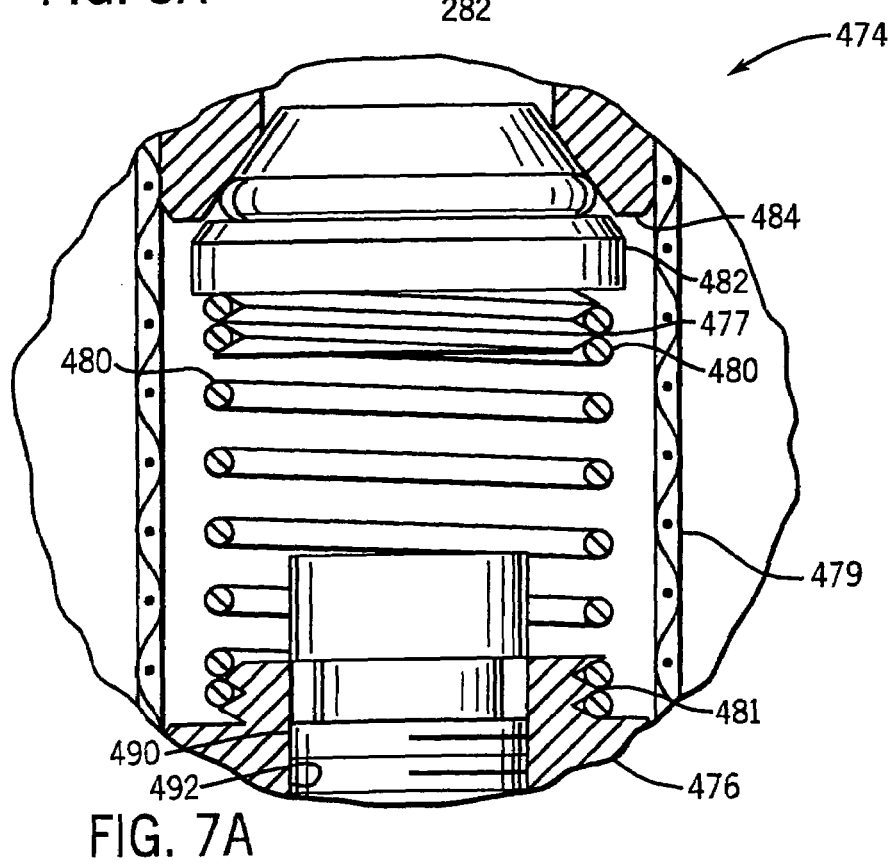
FIG. 7A is a fragmentary elevation view of the thermostatic mixing valve of FIG. 7.
Figure 7:
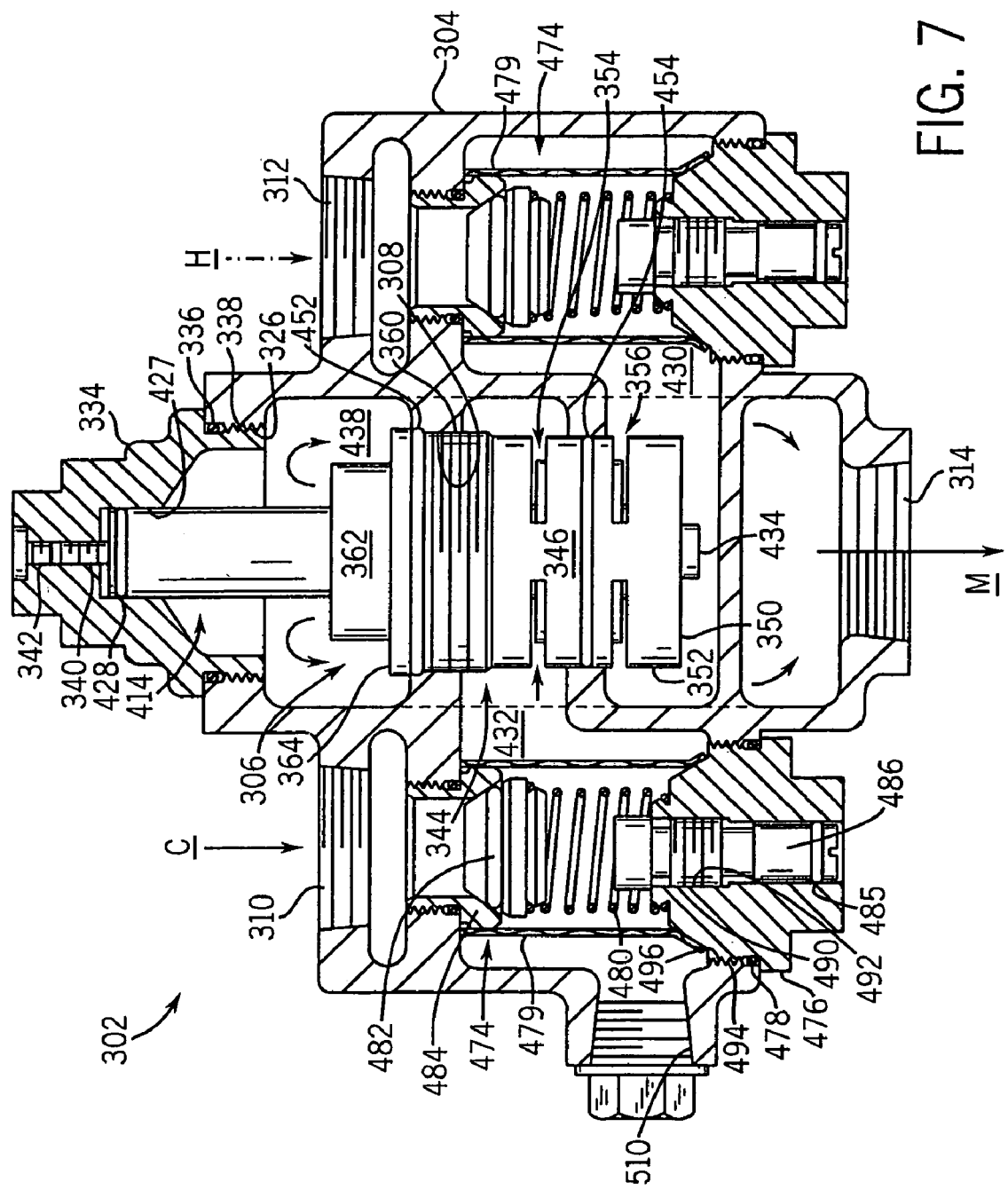
FIG. 7 is a front sectional elevation view of the thermostatic mixing valve of FIG. 5.

FIG. 7 shows valve body 304, valve cap 334, a thermostat 414, thermostat adjusting screw 340 and cover screw 342, a cold fluid inlet chamber 432 and a hot fluid inlet chamber 430, a main mixing chamber 438, and a fluid flow control element shown as a valve member 344. Hot fluid inlet port 312 and cold fluid inlet port 310 are oriented near the right and left sides of the valve respectively, and mixed fluid outlet port 314 is located at the bottom of valve body 304 and is open to a mixed fluid chamber 434. Valve body 304 further includes a cavity 306, open at its top for the receiving of a valve member 344.

A check valve (shown as check valve 474) is assembled to valve body 304 in association with each inlet port 310 and 312. Check valve 474 includes a seat 484, a plug 482, a check valve cap 476, a stem 486, a cylindrical filter screen 479 (with a centering taper), and a biasing spring 480. Check valve cap 476 is provided with threads 494 for engagement with a threaded aperture 496 within valve body 304, and is sealed to valve body 304 with an annular seal 478. Stem 486 is provided with treads 490 for engagement with a threaded aperture 492 centrally located within check valve cap 476, and is sealed to check valve cap 476 by an annular seal 485. Spring 480 holds plug 482 against seat 484 in an absence of flow of mixed fluid from mixed fluid outlet M, fluid pressures being equal on both sides of plug 482 (which may have a tapering shape and may be provided with one or more annular seals) when there is no flow. When mixed fluid M is desired and flow is allowed from mixed fluid outlet M, back pressure drops on the downstream side of plug 482 and inlet supply pressure forces plug 482 downward, compressing spring 480 by a distance corresponding to the pressure difference across plug 482. Spring 480 is configured to have a high lateral stiffness, so that it may not only serve to urge plug 482 against seat 484 but may also guide plug 482 in its path of motion between the opened and closed states of check valve 474.

FIG. 7A is a detail of a portion of check valve 474 shown in FIG. 7. Biasing spring 480 is a compression coil spring, and is engaged with check valve cap 476 by a special thread 481 upon check valve cap 476 having a thread form, pitch, and pitch diameter matching the configuration of biasing spring 480. Biasing spring 480 is similarly engaged with plug 482 by a similar thread 471. For configuring of check valves 474 for operation of thermostatic mixing valve 302, the position of threaded stem 486 within check valve cap 476 is adjusted downwardly as shown to provide plug 482 room to move downward. For service or maintenance of thermostatic mixing valve 302, stem 486 may be turned to advance it upwardly and thereby force plug 482 against seat 484 and close off the associated inlet of thermostatic mixing valve 302.

Valve body 304 is divided into various chambers including a main mixing chamber 438 (of an annular shape, oriented below valve cap 334), a cold fluid chamber 432 (of an annular shape, and in communication with cold fluid inlet port 310), a hot fluid chamber 430 (of an annular shape, and in communication with hot fluid inlet port 312), and mixed fluid outlet chamber 434 in communication with mixed fluid outlet port 314. Valve member 344 is installed within cavity 306 of valve body 304 and is secured within valve body 304 by engagement of a screw thread 360 upon valve member 344 with a screw thread 308 within cavity 306. A preliminary mixing chamber 436 (also shown in FIG. 8) is contained within valve member 344, as is a shuttle 374 for modulating flows of hot and cold fluid (shown in FIGS. 8 and 10).

Figure 9:
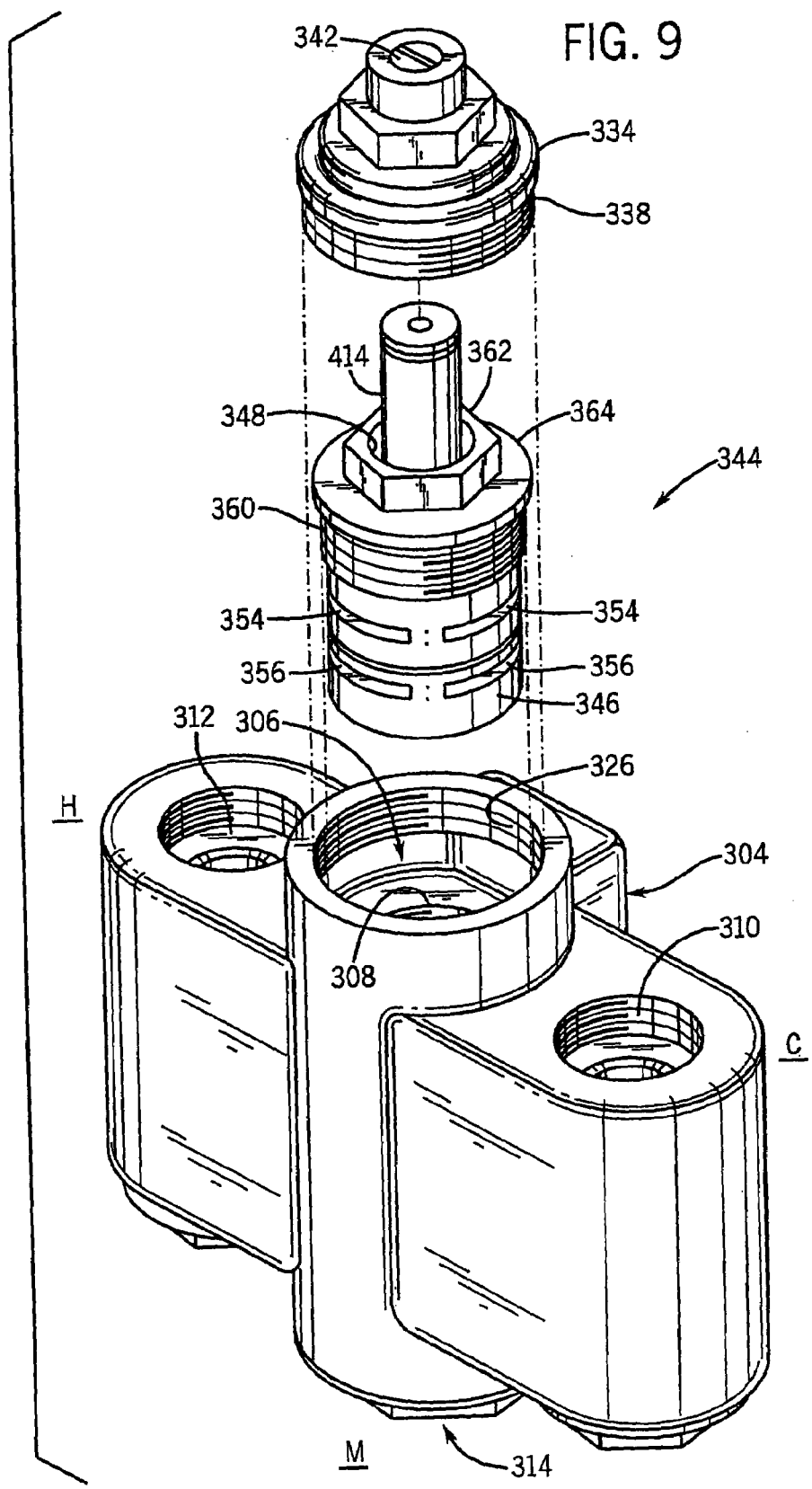
FIG. 9 is an exploded perspective view of the thermostatic mixing valve of FIG. 5.

Referring to FIG. 9, which is a partially exploded view of thermostatic mixing valve 302, valve body 304 is shown with valve member 344 and valve cap 334. Valve member 344 is generally cylindrical in shape and is installed within generally cylindrical valve body cavity 306 inside of valve body 304. A threaded portion 360 of a liner 346 of valve member 344 is engaged with a lower threaded bore 308 within cavity 306 to secure valve member 344 within valve body 304. A upper liner seal 452 and a lower liner seal 454 prevent leakage. Valve cap 334 has a threaded portion 338 that is threaded into an upper threaded bore 326 of valve body 304 to secure valve cap 334 to valve body 304 and to close valve body cavity 306. Valve cap 334 holds adjusting screw 340, the position of which is secured against tampering by cover screw 342. Adjusting screw 340 and cover screw 342 are engaged with screw threads located within an upper area of an aperture 427 extending through valve cap 334, and an upper portion of thermostat 414 is installed with a lower portion of aperture 427 so that it bears upon the bottom of adjusting screw 340. A seal 428 seals thermostat 414 to aperture 427 within valve cap 334, while a seal 336 seals valve cap 334 to valve body 304.

Valve member 344 includes cylindrical liner 346 and thermostat 414 having a cylindrical thermostat housing 416 that is at least partially received within the interior of valve cap 334 when valve cap 334 is threaded onto valve body 304. Valve member 344 further includes a top flange 364 which includes a hub 362 (shown with a hexagonal shape to facilitate installation with a wrench) having a central circular opening 348 within which thermostat housing 416 freely slides. Cylindrical liner 346 of valve member 344 includes two sets of circumferentially oriented openings (shown as upper openings 354 and lower openings 356) which form passages through a side wall 352 of liner 346.

Valve member 344 is shown in an exploded view of FIG. 10 so that the relationship of its elements may be more clearly described.

Thermostat 414, having a thermostat housing 416, is installed within both preliminary mixing chamber 436 and main mixing chamber 438. According to a particularly preferred embodiment, thermostat housing 416 includes at least one thin wall made of a material having a high coefficient of thermal conductivity (e.g., a copper alloy) in order to provide a low thermal impedance from the mixed fluid to a thermally responsive material 226 (e.g. acetone) contained within thermostat housing 416 and thereby shorten response time of thermostatic mixing valve 302. Thermally responsive material 226 has a large coefficient of thermal expansion, and therefore expands substantially upon increasing in temperature and contracts substantially upon decreasing in temperature. Expansion of thermally responsive material 226 within thermostat housing 416 upon an increase in temperature increases a force exerted upon bellows 422 located within thermostat housing 416.

Bellows 422 is constructed in a manner (e.g., using circumferentially corrugated metal) which causes it to be radially stiff but longitudinally flexible. Bellows 422 is hollow and has a first end 424 which is closed and located within thermostat housing 416, and a second end 420 which is open and secured to an open end 418 of thermostat housing 416. Bellows 422 is installed to an open end 418 of housing 416 and is sealed thereto by a seal 462. A valve stem 448 (e.g., a cylindrical rod) extends through an opening in a second end 420 and into bellows 422 so that the upper end of stem 448 bears upon the inner surface of the first end 424 of bellows 422, and is maintained in this bearing relationship by a compressive coil biasing spring 388 pressing upon the lower end of stem 448 through a transversely oriented web 376 of shuttle 374, a relief spring 402, and a disc 412. Shuttle 374, having a cylindrical shape, is slidably received within liner 346 and is provided a seal 368 for sealing cold fluid from hot fluid. The orientation of sliding movement of shuttle 374 and of stem 448 defines the major longitudinal axis of valve member 344, and hence of thermostatic mixing valve 302. Shuttle 374 includes a side wall 378 and a spring pilot portion 390. Side wall 378 is joined to spring pilot portion 390 by a transversely oriented and ring-shaped web 376 having at least one passage 382 through which fluid flows in an axial direction. Spring pilot portion 390 of shuttle 374 has a closed bottom 398 and an open top with a threaded bore (visible in FIG. 8) which is used to assemble a top portion 384 of shuttle 374, a relief spring 402 being retained within a relief spring holder 404, configured as a cavity within spring pilot 390, by top portion 384 of shuttle 374. As shown in FIGS. 8 and 10, an annular space 391 exists between an outer surface of spring pilot portion 390 and an inner surface of side wall 378 of shuttle 374.

Thermally responsive material 226, expanding or contracting within thermostat housing 416 generally in correspondence to an increase or decrease respectively in temperature of the mixed fluid surrounding thermostat housing 416, causes bellows 422 to contract and expand correspondingly and respectively, in opposition to biasing spring 388. Stem 448, in contact with bellows 422, is thereby moved to correspondingly adjust longitudinal position of shuttle 374, which is coupled to stem 448, within liner 346 and to thereby proportionally regulate the sectional flow areas of a cold fluid metering gap 456 and a hot fluid metering gap 458, and thereby the temperature of the mixed fluid. Adjusting screw 340 changes the force exerted by biasing spring 388 by shifting position of the group of parts including thermostat 414, stem 448, shuttle 374, disc 412, and relief spring 402, thereby adjusting temperature of the mixed fluid within main mixing chamber 438 at which shuttle 374 reaches a particular position within liner 346.

The setpoint temperature, or temperature to which thermostat 414 controls is primarily a function of properties of thermally responsive material 226 and force of biasing spring 388, which is influenced by the position of adjusting screw 340. In any preferred embodiment, such design parameters of the valve are selected by the valve designer and manufacturer so that, in normal operation of the valve using hot and cold fluid sources of typical pressures and temperatures, a desired mixed fluid outlet temperature can be obtained with adjusting screw 340 at or near the center of its range of screw thread travel. When adjusting screw 340 is rotated in a clockwise direction (assuming a right-hand thread) to a position farther within valve cap 334, it decreases the setpoint temperature by reducing the open area of lower opening 356 and thereby the flow rate of the hot fluid. Conversely, rotating adjusting screw 340 in an opposite direction to a position nearer the top of valve cap 334 similarly increases the setpoint temperature. Concealing adjusting screw 340 beneath a cover screw 342 discourages unauthorized tampering with adjusting screw 340.

Shuttle 374 and liner 346 thus cooperate to function as a fluid metering valve element. Because of the large diameter of the liner, wherein are located flow control openings 356, relative to diameters of flow control openings of the poppet, plug, or globe types of valve element, the cumulative open area of lower openings 356 is larger than is the open area of a comparably nominally sized metering valve of the poppet, plug, or globe types, allowing a greater amount of flow at any given pressure drop through thermostatic mixing valve 302. A small change in position of shuttle 374 with respect to liner 346 in any preferred embodiment correspondingly results in a comparably greater change in flow rate of hot fluid than does a similar change in position of a hot fluid flow metering element in a thermostatic mixing valve of the poppet, plug, or globe type.

The direction of movement of shuttle 374 within liner 346 is perpendicular to that of the fluid being metered, the fluid thereby not exerting a stagnation or velocity pressure against the face of shuttle 374 as it does against the flow control element of a poppet, plug, or globe valve. This enables control of higher flow rates at higher velocities and pressures using a smaller thermostat than is possible with thermostatic valve of the previously used poppet, plug, or globe types.

Valve member 344 includes a top shuttle portion 384 having a central circular opening 386. Valve stem 448 is inserted at its lower end through opening 386 and abuts disc 412, which provides an enlarged area upon which relief spring 402 bears. Disc 412 and relief spring 402 are installed within spring pilot portion 390 of shuttle 374, and are secured therein by top portion 384 of shuttle 374 when it is installed to spring pilot 390 portion by, e.g., screw threads. The lower end of valve stem 448 extends slidably through the central circular opening 386 within top portion 384, and is maintained in contact with disc 412 by biasing spring 388.

Liner 346 is provided a bottom wall 350, which is configured as a separate part although it may alternatively be made integral with liner 346. As shown, bottom wall 350 is a threaded plug having a central interior recess 366 for seating of biasing spring 388. Bottom wall 350 also includes a seat 370 for seating of a bottom edge 380 of outer wall 378 of shuttle 374. Biasing spring 388 is seated at its upper end upon ring-shaped web 376 and around the perimeter of spring pilot 390 portion of shuttle 374.

Operation of thermostatic mixing valve 302 is described below in reference to FIGS. 8A through 8D.

Figure 8A:
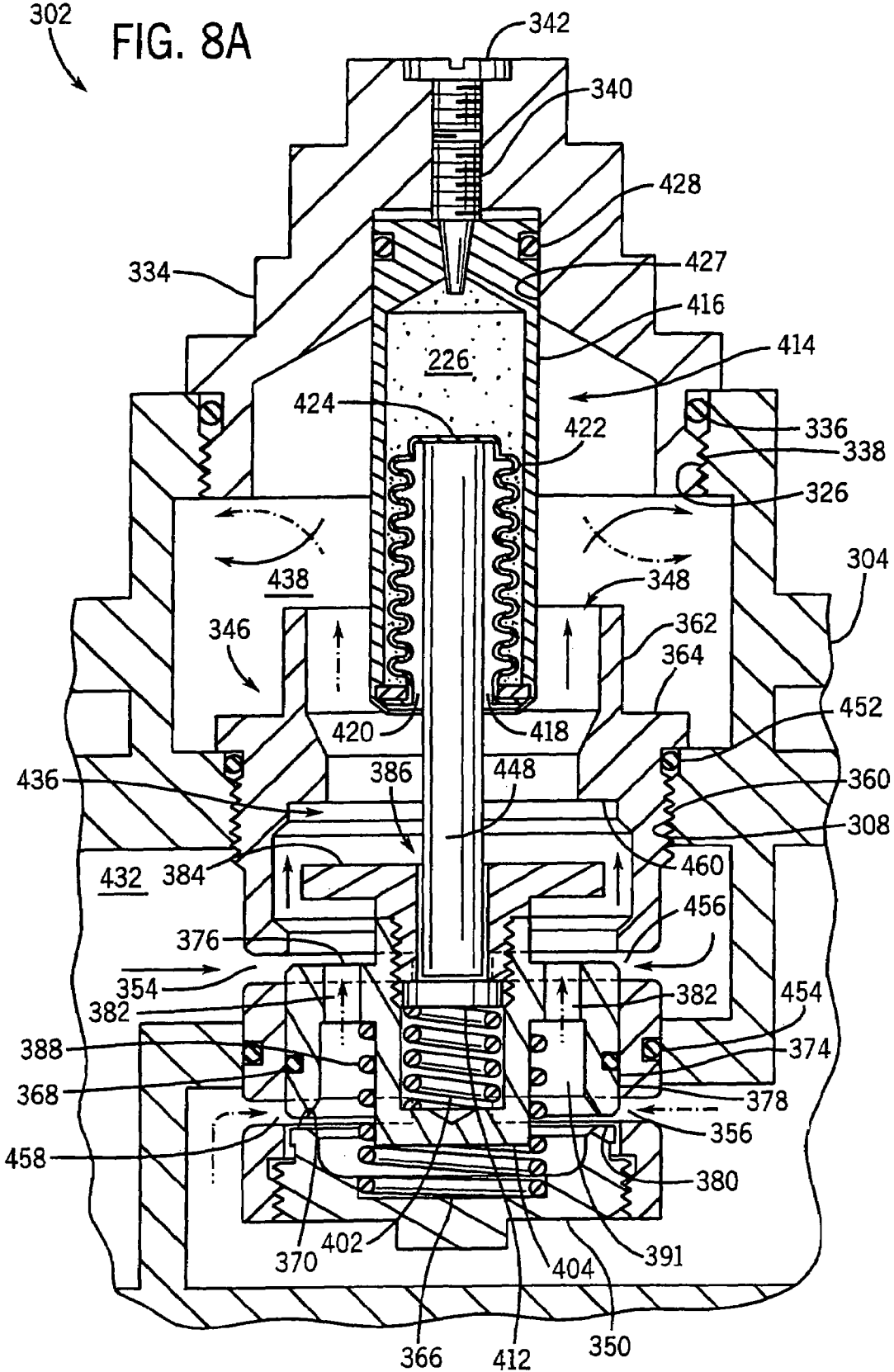
FIG. 8A is a front sectional elevation view of the thermostatic mixing valve of FIG. 5 showing flow of both hot fluid and cold fluid.

FIG. 8A shows thermostatic mixing valve 302 in normal operation, with shuttle 374 intermediately oriented within liner 346. Cold fluid from cold fluid inlet port 310 flows through upper openings 354 within side wall 352 of liner 346, and hot fluid from hot fluid inlet port 312 flows through lower openings 356 within side wall 352 of liner 346 and through passages 382 of shuttle 374. Mixing of the hot and cold fluids begins immediately, continues in preliminary mixing chamber 436, and is completed as the at least partially mixed fluids enter main mixing chamber 438. Thermostat 414 is immersed in the mixed fluid at a particular temperature within main mixing chamber 438, and thermally responsive material 226 is at substantially the same temperature due to thermal convection at the wall of housing 416 and thermal conduction through the wall of housing 416. Thermally responsive material 226 within thermostat housing 416, and therefore bellows 422, are neither fully contracted nor fully expanded, nor is biasing spring 388 fully contracted or fully extended. In normal operation, the temperature of the mixed fluid is controlled by axial position of shuttle 374 within and with respect to liner 346, which is in turn controlled by the corresponding specific volume of thermally responsive material 226 at that temperature and by the opposing force of biasing spring 388, the latter corresponding to the position of adjusting screw 340.

Figure 8B:
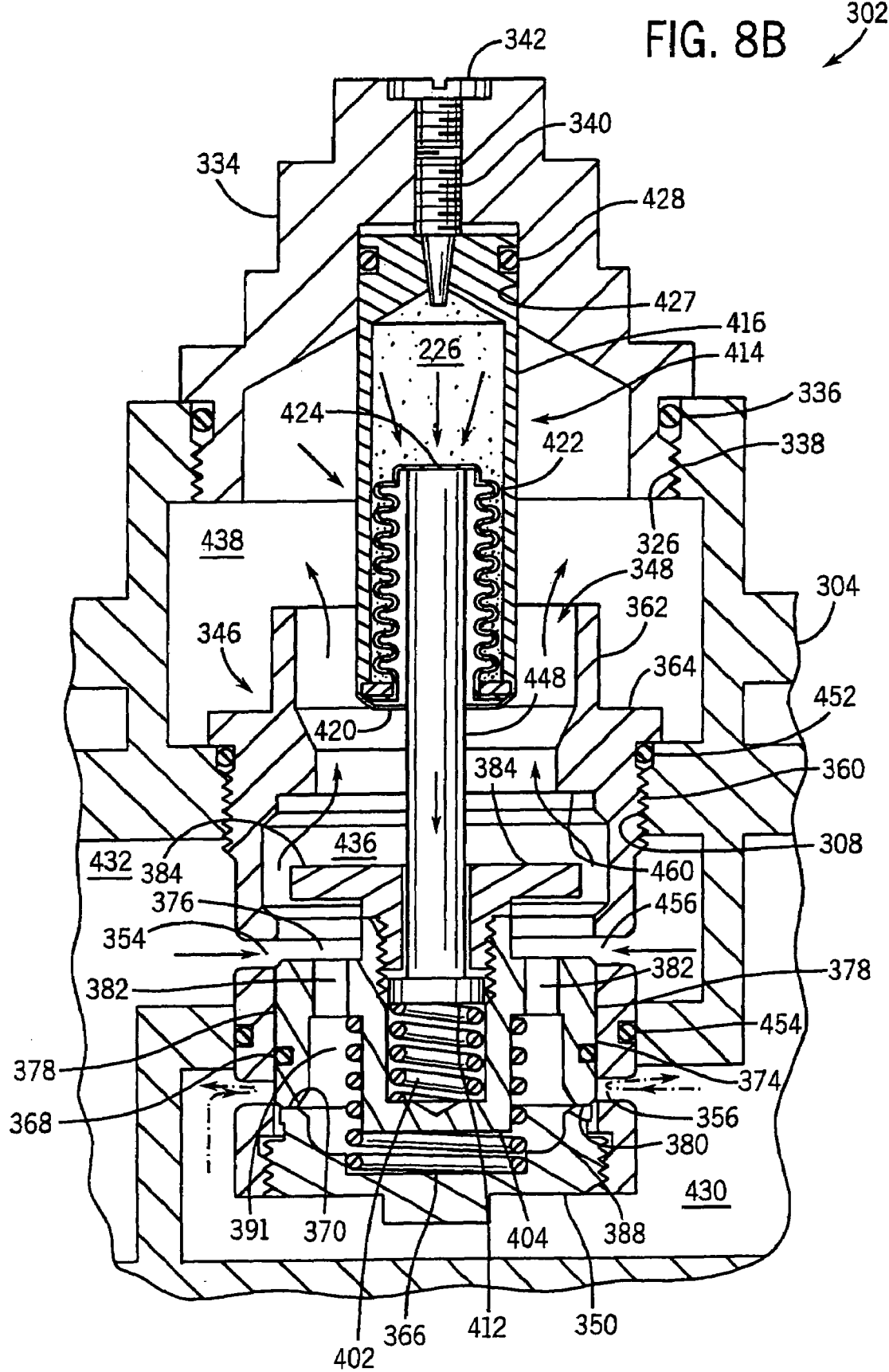
FIG. 8B is a front sectional elevation view of the thermostatic mixing valve of FIG. 5 showing flow of only cold fluid.

In FIG. 8B, the valve is shown compensating for a hot outlet fluid condition (with respect to the temperature setting). Shuttle 374 is oriented fully downward (at the end of its normal axial path of travel) within liner 346 because thermally responsive material 226 has expanded and bellows 422 has therefore contracted, thereby moving shuttle 374 downwardly.

Were the mixed fluid to be still hotter, thermally responsive material 226 would attempt to expand further and, if stem 448 were blocked against further movement downward, thermally responsive material 225 could expand to the point that damage could result to housing 416, bellows 422, or the junction of bellows 422 with housing 416. To prevent this from happening, relief spring 402 provides for additional movement of stem 448 when shuttle 374 is blocked by seat 370 of bottom wall 350 against further movement, thereby relieving force otherwise caused by excessive expansion of thermally responsive material 226. Lower openings 356 within side wall 352 of liner 346 are closed, blocked by side wall 378 or shuttle 374. The bottom edge 380 of side wall 378 of shuttle 374 rests against the top of seat 370 of bottom wall 350, and side wall 378 of shuttle 374 closes lower openings 356, reducing hot fluid metering gap 458 to substantially zero which substantially prevents the flow of hot fluid into preliminary mixing chamber 436. Cold fluid flows through upper openings 354 of liner 346 and into preliminary mixing chamber 436 (above shuttle 374). The temperature of the mixed fluid in main mixing chamber 438 thus decreases because the flow from cold fluid inlet chamber 432 is in greater proportion of the total flow than it had been. As the temperature of the mixed fluid decreases, causing thermally responsive material 226 to contract, bellows 422 expands, readjusting the position of shuttle 374 and bringing the temperature of the mixed fluid into an equilibrium condition with respect to the temperature setting of the valve.

Figure 8C:
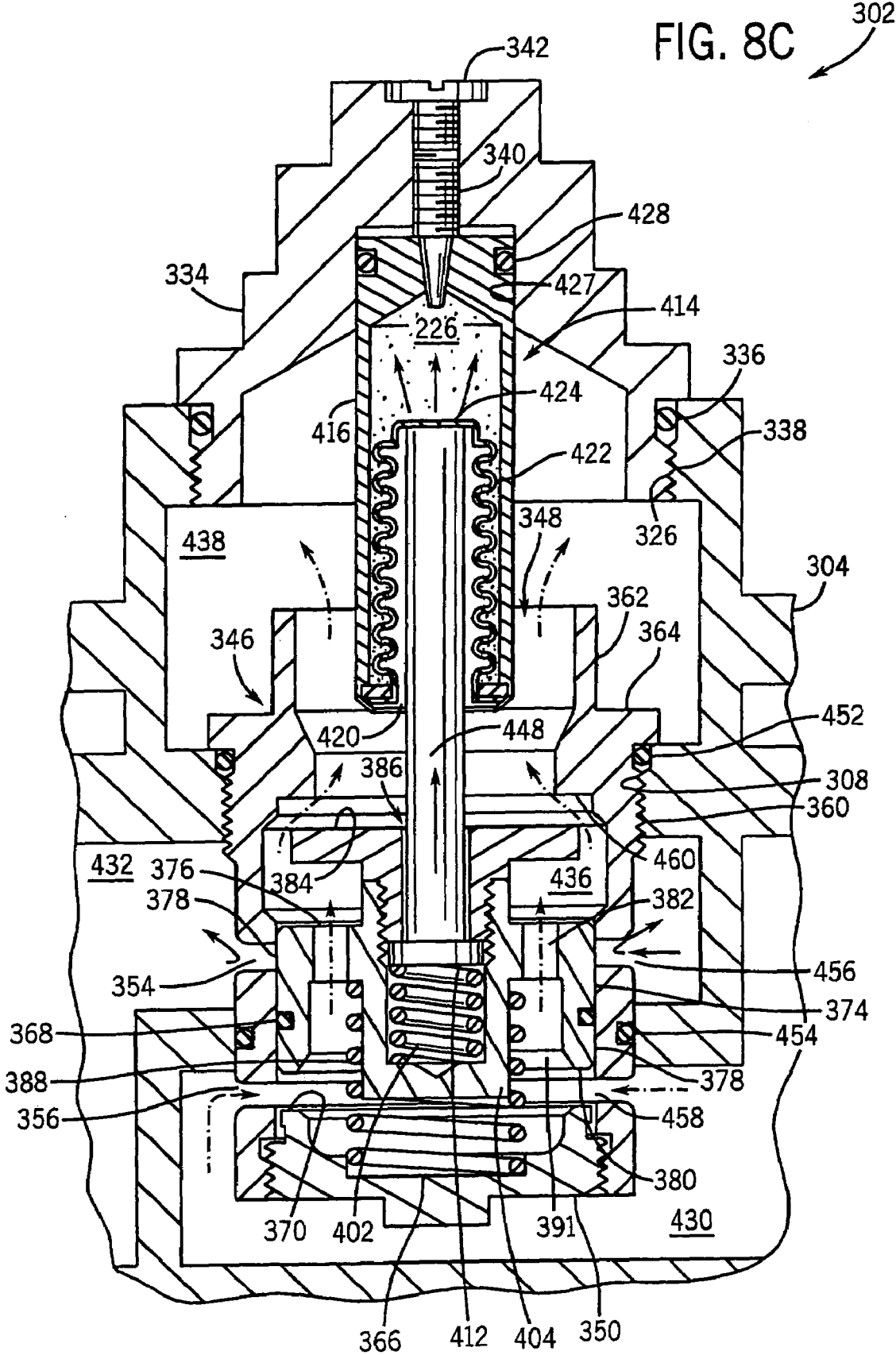
FIG. 8C is a front sectional elevation view of the thermostatic mixing valve of FIG. 5 showing flow of only hot fluid.

In FIG. 8C, the valve is shown compensating for a cold fluid condition (with respect to the temperature setting of the valve). Shuttle 374 is oriented upwardly (at the end of its normal axial path of travel as constrained by valve stem 448 within bellows 422) within liner 346 because thermally responsive material 226 has contracted, allowing bellows 422 to expand and thereby allowing biasing spring 388 to expand (within a constrained axial path of travel defined by valve stem 448 within bellows 422 of thermostat 414). Upper openings 354 of liner 346 are closed, blocked by side wall 378 of shuttle 374, which reduces cold fluid metering gap 456 to substantially zero and thereby substantially prevents the flow of cold fluid into preliminary mixing chamber 436. Hot fluid flows through lower openings 356 of liner 346 and into preliminary mixing chamber 436 (through passages 382 within shuttle 374). The temperature of the mixed fluid in main mixing chamber 438 thus increases because the flow from hot fluid chamber 430 is in greater proportion of the total flow than it had been. Bellows 422 thereafter contracts as the temperature of the mixed fluid, and of thermally responsive material 226, increases, readjusting the position of shuttle 374 and thereby bringing the temperature of the mixed fluid into an equilibrium condition with respect to the temperature setting of the valve.

Figure 8D:
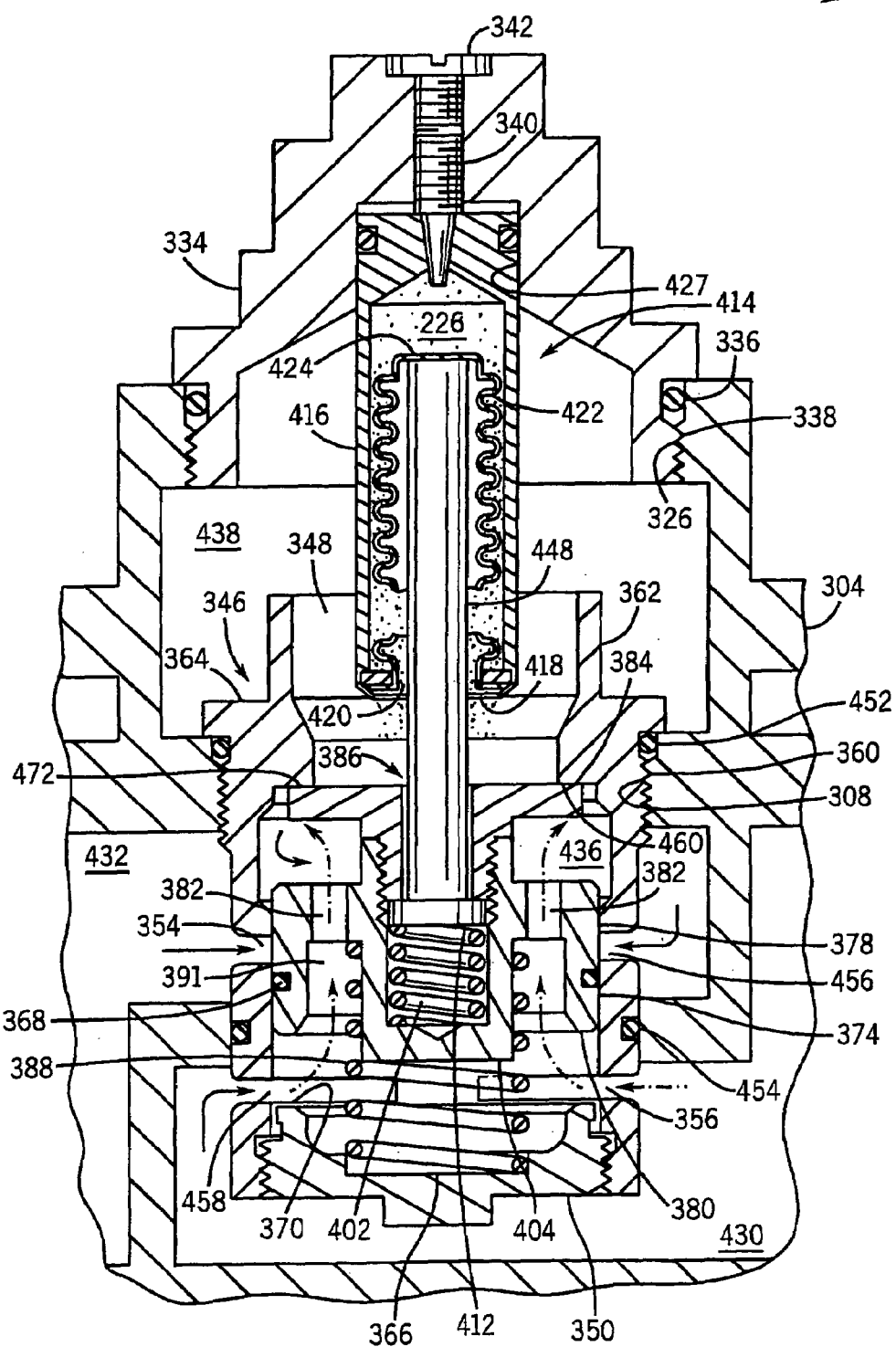
FIG. 8D is a front sectional elevation view of the thermostatic mixing valve of FIG. 5 showing the thermostat having failed and no fluid flow.

In FIG. 8D, thermostatic mixing valve 302 is shown in a failure condition caused by rupture of bellows 422 within thermostat housing 416. Biasing spring 388 has fully expanded (no longer constrained by bellows 422, see FIG. 8C), driving shuttle 374 upward and thereby forcing disc 412 into valve stem 448 and driving top portion 384 of shuttle 374 fully upward into an auxiliary seat 460, effectively forming a backup shutoff valve 472 within thermostatic mixing valve 302. While hot fluid flows through lower openings 356 of liner 346 and through at least one shuttle passage 382 up into preliminary mixing chamber 436, it is prevented from flowing beyond preliminary mixing chamber 436 and into main mixing chamber 438 by the engagement of upper portion 384 with auxiliary seat 460. Moreover, upper openings 354 of liner 346 are blocked by side wall 378 of shuttle 374 to shut off flow of cold fluid. The seating of top portion 384 upon auxiliary seat 460 blocks all flow from preliminary mixing chamber 436 to main mixing chamber 438 by biasing spring 388. Consequently, no fluid (hot, cold, or mixed) flows through outlet port 314.

As shown in the embodiments of FIGS. 1–3 and 5–7, valve body 104, 304 includes a third fluid inlet 510 positioned between the check valve seat 284, 484 and the mixed fluid outlet port 114, 314. Illustratively, the third fluid inlet port 510 is between the cold fluid inlet port 110, 310 and the mixed fluid outlet port 114, 314. Further illustratively, in the embodiment of FIG. 3, third fluid inlet 510 is adjacent to plug 282. As shown in FIGS. 3 and 7, third fluid inlet 510 is illustratively between the mixing chamber 238, 438 and check valve seat 284, 484.

Although only a few exemplary embodiments of the present invention have been described in detail, those skilled in the art will readily appreciate that many modifications are possible in the exemplary embodiments without materially departing from the novel teachings and advantages of this invention. For example, valve caps may be secured to valve bodies by machine screws; bellows may be brazed or soldered to thermostat housing walls or bases to form substantially hermetic seals. Accordingly, all such modifications are intended to be included within the scope of the invention as defined in the following claims. In the claims, each means-plus-function clause is intended to cover the structures described herein as performing the recited function, and not only structural equivalents but also equivalent structures. Other substitutions, modifications, changes, and omissions may be made in the designs, operating conditions, and arrangements of the preferred embodiments without departing from the spirit of the invention as expressed in the appended claims.

What is claimed is:

1. A mixing valve comprising:
   a valve body formed to include
   a hot fluid inlet,
   a cold fluid inlet,
   a third fluid inlet,
   a mixed fluid outlet,
   a first chamber for receiving cold fluid from the cold fluid inlet and third fluid from the third fluid inlet,
   and a mixing chamber positioned to receive fluid from the first chamber and the hot fluid inlet and discharge a mixture of the received hot, cold, and third fluids from the mixing chamber via the mixed fluid outlet port,
   a thermostat to sense the temperature of fluid in the mixing chamber and move a valve member in response to changes in the temperature of fluid in the mixing chamber,
   the third fluid inlet positioned relative to the cold fluid inlet to permit fluid to flow through the third fluid inlet and mix with the fluid from the cold fluid inlet in the first chamber prior to being received by the mixing chamber.

2. The mixing valve of claim 1, wherein the third fluid inlet is positioned relative to the cold fluid inlet to permit third fluid to flow through the third fluid inlet into a cold fluid chamber in a direction substantially transverse to the direction of cold fluid flows through the cold fluid inlet.

3. The mixing valve of claim 1, further comprising a check valve, wherein the third fluid inlet is positioned downstream of the check valve so that, when the check valve is in a closed orientation, the flow of fluid through the cold fluid inlet is substantially obstructed, and the third fluid inlet is substantially unobstructed.

4. The mixing valve of claim 1, wherein the third fluid inlet is positioned so that fluid flows from the third fluid inlet in a direction that is substantially transverse to the direction of movement of the valve member.

5. The mixing valve of claim 4, wherein the third fluid inlet is positioned relative to the cold fluid inlet to permit fluid to flow through the third fluid inlet into a cold fluid chamber in a direction substantially transverse to the direction in which cold fluid flows through the cold fluid inlet.

6. The mixing valve of claim 3, wherein the check valve includes a check valve member movable between a position engaging a seat to restrict flow of fluid past the seat to a position permitting flow of fluid past the seat, and the third fluid inlet is positioned so that fluid flows from the third fluid inlet in a direction that is substantially transverse to the direction of movement of the check valve member.

7. The mixing valve of claim 6, wherein the third fluid inlet is positioned relative to the cold fluid inlet to permit fluid to flow through the third fluid inlet into a cold fluid chamber in a direction substantially transverse to the direction in which cold fluid flows through the cold fluid inlet.

8. The mixing valve of claim 1, further comprising a cap, and the third fluid inlet is an opening formed in the valve body and is sized to receive the cap when the third fluid inlet is not in use.

9. The mixing valve of claim 8, wherein the cap and the opening are complementarily threaded.

10. The mixing valve of claim 2, further comprising a threaded cap, and the third fluid inlet is an opening formed in the valve body and is complementarily threaded and sized to receive the cap when the third fluid inlet is not in use.

11. A method of mixing fluids comprising:

providing a valve body formed to include a hot fluid inlet, a cold fluid inlet, a third fluid inlet adjacent the cold fluid inlet, and a mixing chamber positioned to receive fluid from the hot, cold, and third fluid inlets, the valve body further comprising a thermostat positioned at least partially in the mixing chamber to sense the temperature of a mixture of the fluids received via the hot, cold, and third inlets in the mixing chamber and move a valve member in response to changes in the temperature of fluid in the mixing chamber, and introducing a third fluid via the third fluid inlet and introducing cold fluid via the cold fluid inlet into a cold fluid chamber to permit blending of cold fluid and third fluid.

12. The method of claim 11, wherein the valve body is formed to include a third fluid inlet positioned relative to the cold fluid inlet to permit fluid to flow through the third fluid inlet into the cold fluid chamber in a direction substantially transverse to the direction of cold fluid flows through the cold fluid inlet.

13. The method of claim 11, wherein the valve body is formed to include a third fluid inlet, the valve body further comprising a check valve in the cold fluid inlet, wherein the third fluid inlet is positioned downstream of the check valve so that, when the check valve is in a closed orientation, the flow of fluid through the cold fluid inlet is substantially obstructed, and the third fluid inlet is substantially unobstructed.

14. The method of claim 13, wherein the third fluid inlet is positioned relative to the cold fluid inlet to permit fluid to flow through the third fluid inlet into the cold fluid chamber in a direction substantially transverse to the direction in which cold fluid flows through the cold fluid inlet.

15. The method of claim 13, wherein the check valve includes a check valve member movable between a position engaging a seat to restrict flow of fluid past the seat to a position permitting flow of fluid past the seat, and the third fluid inlet is positioned so that fluid flows from the third fluid inlet in a direction that is substantially transverse to the direction of movement of the check valve member.

16. The method of claim 15, wherein the third fluid inlet is positioned relative to the cold fluid inlet to permit fluid to flow through the third fluid inlet into the cold fluid chamber in a direction substantially transverse to the direction in which cold fluid flows through the cold fluid inlet.

17. The method of claim 12, further comprising providing a cap, and the third fluid inlet is an opening formed in the valve body and is sized to receive the cap when the third fluid inlet is not in use.

18. The method of claim 17, wherein the cap is complementarily threaded with complementary threads formed at the opening.

19. The method of claim 12, further comprising providing a threaded cap, and the third fluid inlet is an opening formed in the valve body and is complementarily threaded and sized to receive the cap when the third fluid inlet is not in use.

20. A system for mixing fluids comprising: a mixing valve and a fluid conducting network, the mixing valve including a mixed fluid outlet, a hot fluid inlet, a cold fluid inlet, a third fluid inlet adjacent the cold fluid inlet, a first chamber for receiving cold fluid from the cold fluid inlet and third fluid from the third fluid inlet, and a mixing chamber positioned to receive fluid via the first chamber and the hot fluid inlet, a valve member to adjust the amount of fluid flowing through at least one of the hot and the cold fluid inlets, and a thermostat to move the valve member in response to changes in temperature of the fluid adjacent the thermostat, the fluid conducting network coupled to the mixing valve and including a hot fluid supply line to supply hot fluid to the hot fluid inlet of the mixing valve, a cold fluid supply line to supply cold fluid to the mixing valve, a mixed water line coupled to the mixed fluid outlet, and a recirculation line coupled between the mixed water line and the third fluid inlet to permit flow of third fluid to the mixing valve via the third fluid inlet.

* * * * *